United States Patent
Makita et al.

(10) Patent No.: US 6,948,767 B2
(45) Date of Patent: Sep. 27, 2005

(54) VEHICLE BODY FRONT SECTION STRUCTURE

(75) Inventors: Masashi Makita, Fujisawa (JP); Chinmoy Pal, Yokosuka (JP)

(73) Assignee: Nissan Motor Co., Ltd., Kanagawa (JP)

( * ) Notice: Subject to any disclaimer, the term of this patent is extended or adjusted under 35 U.S.C. 154(b) by 0 days.

(21) Appl. No.: 10/766,025

(22) Filed: Jan. 29, 2004

(65) Prior Publication Data

US 2004/0183338 A1 Sep. 23, 2004

(30) Foreign Application Priority Data

Mar. 5, 2003 (JP) .................................... 2003-059011
Mar. 5, 2003 (JP) .................................... 2003-059016
Mar. 5, 2003 (JP) .................................... 2003-059023

(51) Int. Cl.$^7$ ............................................. B62D 25/08
(52) U.S. Cl. .................. 296/187.09; 296/205; 296/203; 280/784
(58) Field of Search ................ 296/187.01, 187.09, 296/193.01, 205, 204, 203.02, 29; 180/311; 280/781, 784

(56) References Cited

U.S. PATENT DOCUMENTS

| | | | | |
|---|---|---|---|---|
| 2,856,226 A | * | 10/1958 | Purdy | .......................... 296/204 |
| 3,171,669 A | * | 3/1965 | Barenyi | ....................... 280/784 |
| 3,520,552 A | * | 7/1970 | Graham et al. | ............. 280/784 |
| 3,638,748 A | * | 2/1972 | Tixier | ......................... 180/232 |
| 4,057,263 A | * | 11/1977 | Schwuchow et al. | ....... 280/797 |
| 5,862,877 A | * | 1/1999 | Horton et al. | .............. 180/312 |
| 6,811,211 B2 | * | 11/2004 | Saito | ..................... 296/203.02 |
| 2004/0100127 A1 | * | 5/2004 | Saitou | .................... 296/203.02 |
| 2004/0195862 A1 | * | 10/2004 | Saeki | .................... 296/187.09 |
| 2004/0200659 A1 | * | 10/2004 | Miyasaka | ................... 108/312 |

FOREIGN PATENT DOCUMENTS

JP 2002-356179 A 12/2002

* cited by examiner

*Primary Examiner*—Patricia L. Engle
(74) *Attorney, Agent, or Firm*—Shinjyu Global IP Counselors, LLP

(57) ABSTRACT

A vehicle body front section structure is provided with longitudinal frame members that are connected by curved parts to the back surface of a widthwise frame member to disperse the load when the vehicle undergoes a front collision. In particular, wedge-shaped open spaces exist between the back surface of the widthwise frame member and the wall surface of the curved part of each longitudinal frame member that faces the back surface. Consequently, when the vehicle undergoes a front collision, the rearward collapsing of the widthwise frame member causes the curved part to gradually undergo bending deformation while being folded over in such a manner that the wall surface thereof that faces the back surface touches against the back surface.

25 Claims, 18 Drawing Sheets

US 6,948,767 B2

VEHICLE BODY FRONT SECTION STRUCTURE

BACKGROUND OF THE INVENTION

1. Field of the Invention

The present invention generally relates to a vehicle body front section structure for automobiles. More specifically, the present invention relates to a vehicle body front section structure that is configured to absorb the initial energy of a front collision.

2. Background Information

Vehicle body front section structures for automobiles typically include structures in which the front ends of the front side members constituting longitudinal frame members and a cross member constituting a widthwise frame member are connected together through crush boxes arranged along the axes of the front side members. With such a front section structure, when the vehicle undergoes a front collision, the crush boxes collapse to both absorb the initial energy and stabilize the axial buckling deformation (axial collapse) of the of the front side members. One example of such a vehicle body front section structure is disclosed in Japanese Laid-Open Patent Publication No. 2002-356179 (see, page 3, FIG. 4).

In view of the above, it will be apparent to those skilled in the art from this disclosure that there exists a need for an improved vehicle body front section structure. This invention addresses this need in the art as well as other needs, which will become apparent to those skilled in the art from this disclosure.

SUMMARY OF THE INVENTION

It has been discovered that although absorbing energy by using axial collapse of the longitudinal frame members as just described is effective at suppressing deformation of the cabin of the vehicle in a front collision, there is a tendency for the axial load of the collision to concentrate in the axial direction of the longitudinal frame members during a front collision.

While it is also desirable to suppress the level of damage to both of the vehicles involved in a front collision, when, for example, one vehicle is large and the other is small such that the shapes of the front sections of the vehicles do not match, there is the possibility that insufficient interaction will occur in addition to the aforementioned axial load concentration in the longitudinal frame members.

Therefore, the object of the present invention is to provide a vehicle body front section structure that can disperse the load when the vehicle undergoes a front collision so that the load does not concentrate in the axial direction of the longitudinal frame members and can achieve good transmission of axial loads to the longitudinal frame members even in collisions having small overlap rates.

The foregoing object can basically be attained by providing a vehicle body front section structure in accordance with the present invention that basically comprises a pair of longitudinal frame members and a widthwise frame member. The longitudinal frame members are configured and arranged to extend in a lengthwise direction of a vehicle on both widthwise sides of a front compartment. Each of the longitudinal frame members has a front end portion with a curved part disposed forwardly of a curvature transition point. The widthwise frame member has a back surface connected to the front end portions of the longitudinal frame members such that the widthwise frame member extends in the widthwise direction of the vehicle. The curved parts is disposed at locations rearward connection points between the longitudinal frame members and the widthwise frame member such that a pair of wedge-shaped open spaces are formed between the back surface of the widthwise frame member and corresponding wall surfaces of the curved parts that faces the back surface of the widthwise frame member. More specifically, since the front ends of at least one pair of longitudinal frame members are connected to a back surface of a widthwise frame member, the aforementioned bending deformation proceeds in such a manner that the front ends of the longitudinal frame members touch against the back surface of the widthwise frame member and the collision contact surface area can be increased reliably. By applying this arrangement to the main longitudinal frame members for absorbing collision energy, the load can be prevented from concentrating in the axial direction of the main longitudinal frame members and the degree of damage to the front section of the vehicle can be suppressed.

These and other objects, features, aspects and advantages of the present invention will become apparent to those skilled in the art from the following detailed description, which, taken in conjunction with the annexed drawings, discloses a preferred embodiment of the present invention.

BRIEF DESCRIPTION OF THE DRAWINGS

Referring now to the attached drawings which form a part of this original disclosure.

DETAILED DESCRIPTION OF THE PREFERRED EMBODIMENTS

Selected embodiments of the present invention will now be explained with reference to the drawings. It will be apparent to those skilled in the art from this disclosure that the following descriptions of the embodiments of the present invention are provided for illustration only and not for the purpose of limiting the invention as defined by the appended claims and their equivalents.

Referring initially to FIGS. 1–6, a vehicle body frame structure an automobile is illustrated in accordance with a first embodiment of the present invention. The vehicle body is a unibody construction, i.e., the vehicle body is not mounted on a chassis, but rather the frame is built into the vehicle body.

Figure 1:
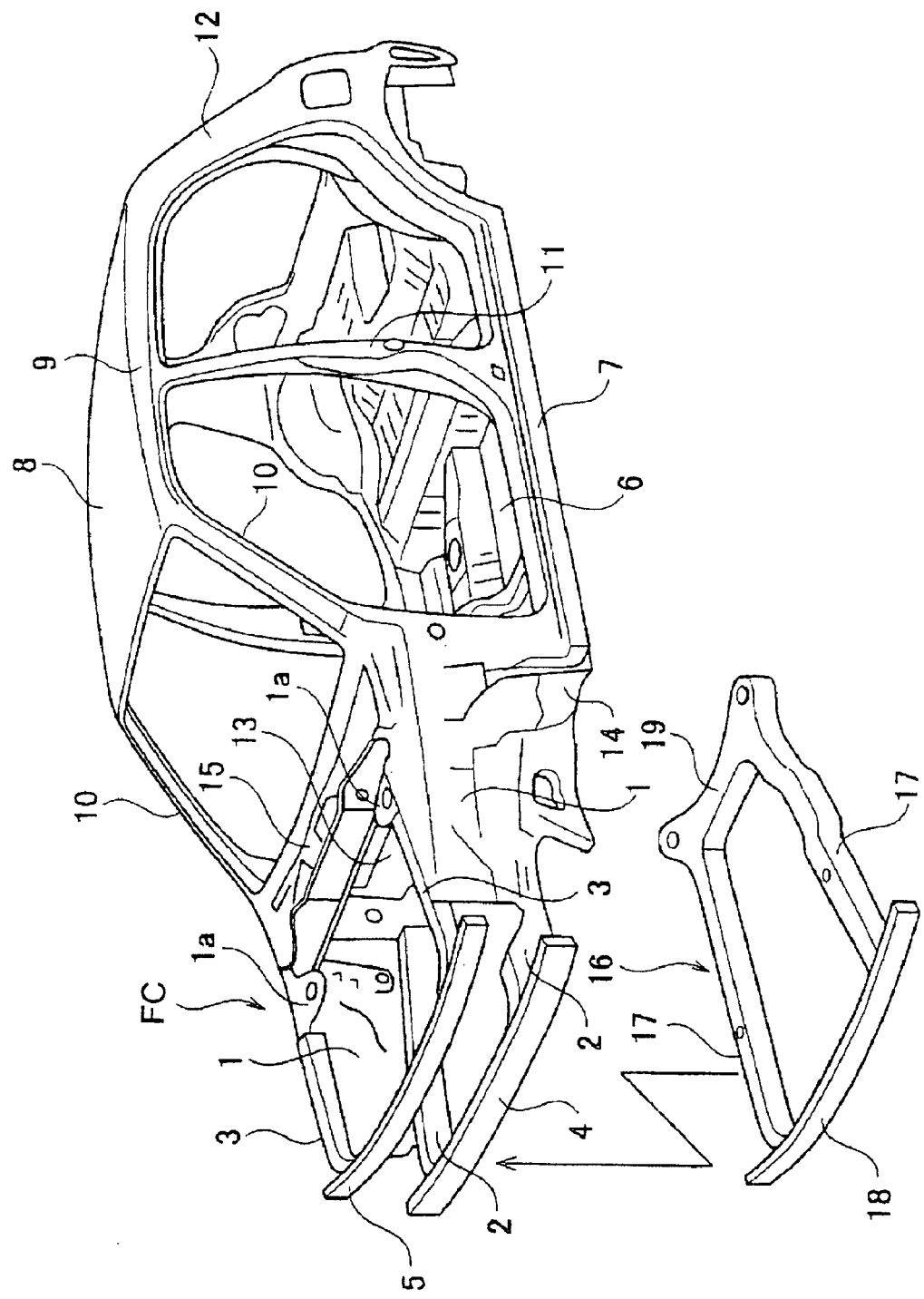
FIG. 1 is a perspective view of a vehicle body showing the vehicle body frame structure of an automobile in accordance with a first embodiment of the present invention.

As shown in FIG. 1, the vehicle body front section structure and a cabin frame structure are integrated to form a unibody type of vehicle body in accordance with the present invention. In this embodiment, the vehicle body front section structure basically includes a pair of hood ledge panels 1, a pair of longitudinally arranged front side members 2, a pair of longitudinally arranged hood ledge members 3, a center cross member 4 and an upper cross member 5.

The hood ledge panels 1 are integrated with the front side members 2 and the hood ledge members 3 to form a pair of side hood ledge structures. The front side members 2 serving as a first pair of longitudinal frame members joined to bottom edge portions of hood ledge panels 1 forming the left and right side walls of the front compartment FC. The front side members 2 serve as a first pair of longitudinal frame members, while portions of the hood ledge members 3 serve as a second pair of longitudinal frame members. The front side members 2 function as the main energy absorbing members when the vehicle undergoes a front collision. The front side members 2 are preferably formed with closed cross sections.

The cabin frame structure basically comprises a floor panel 6 with a pair of side sills 7 arranged on the left and right sides of the floor panel 6, a roof panel 8 with a pair of roof side rails 9 arranged on the left and right sides of the roof panel 8, a pair of front pillars 10 arranged on the left and right sides of the roof side rails 9, a pair of center pillars 11, a pair of rear pillars 12 arranged vertically between the side sills 7 and the roof side rails 9 arranged on the left and right sides of the roof side rails 9, a dash panel 13 arranged to extend between the left and right sides of the vehicle body front section structure, a pair of outriggers 14, and a cowl box 15 arranged such that it traverses between the left and right front pillars 10 at the upper edge portion of the dash panel 13.

The front side members 2 function as the main energy absorbing members when the vehicle undergoes a front collision and, therefore, are formed with closed cross sections. The rear end portions of the front side members 2 run from the dash panel 13 around and under the floor panel 6 and extend rearward as extension side members. At the rear end portions of the front side members 2 where they form the extension side members, the front side members 2 are also connected to the front end portions of the side sills 7 through outriggers 14.

Joined to the top edge portions of the hood ledge panels 1 are longitudinally arranged hood ledge members 3 that serve as longitudinal frame members and have closed cross sectional structures.

The center cross member 4 and the upper cross member 5, each have a closed cross sectional structure that is arranged in the widthwise direction. The center cross member 4 and the upper cross member 5 are connected such that they traverse between the front end portions of the left and right front side members 2 and the left and right hood ledge members 3. In this embodiment, the hood ledge members 3 are connected to strut towers 1a (which are frame parts of the hood ledge panels 1) at the rear end parts thereof and linked to the cowl box 15 and front pillar 10 through the strut towers 1a.

A sub frame 16 is provided in the bottom of the front compartment FC for mounting and supporting a power unit. The sub frame 16 basically includes left and right side frames 17 that serve as longitudinal frame members and a lower cross member 18 that serves as a widthwise frame member and is connected across the front ends of the left and right side frames 17. In this embodiment, the rear end parts of the left and right side frame members 17 are linked to a rear frame 19 to form a generally rectangular shape.

The members of the sub frame 16, i.e., the frames 17 and 19 and the lower cross member 18, all have a closed cross sectional structure. Longitudinally intermediate parts of the side frames 17 are connected to the bottom surfaces of the front side members 2 through mounting members and the rear end parts of the side frame members 17 are connected to the bottom surfaces of the outriggers 14 through mounting members.

Figure 2:
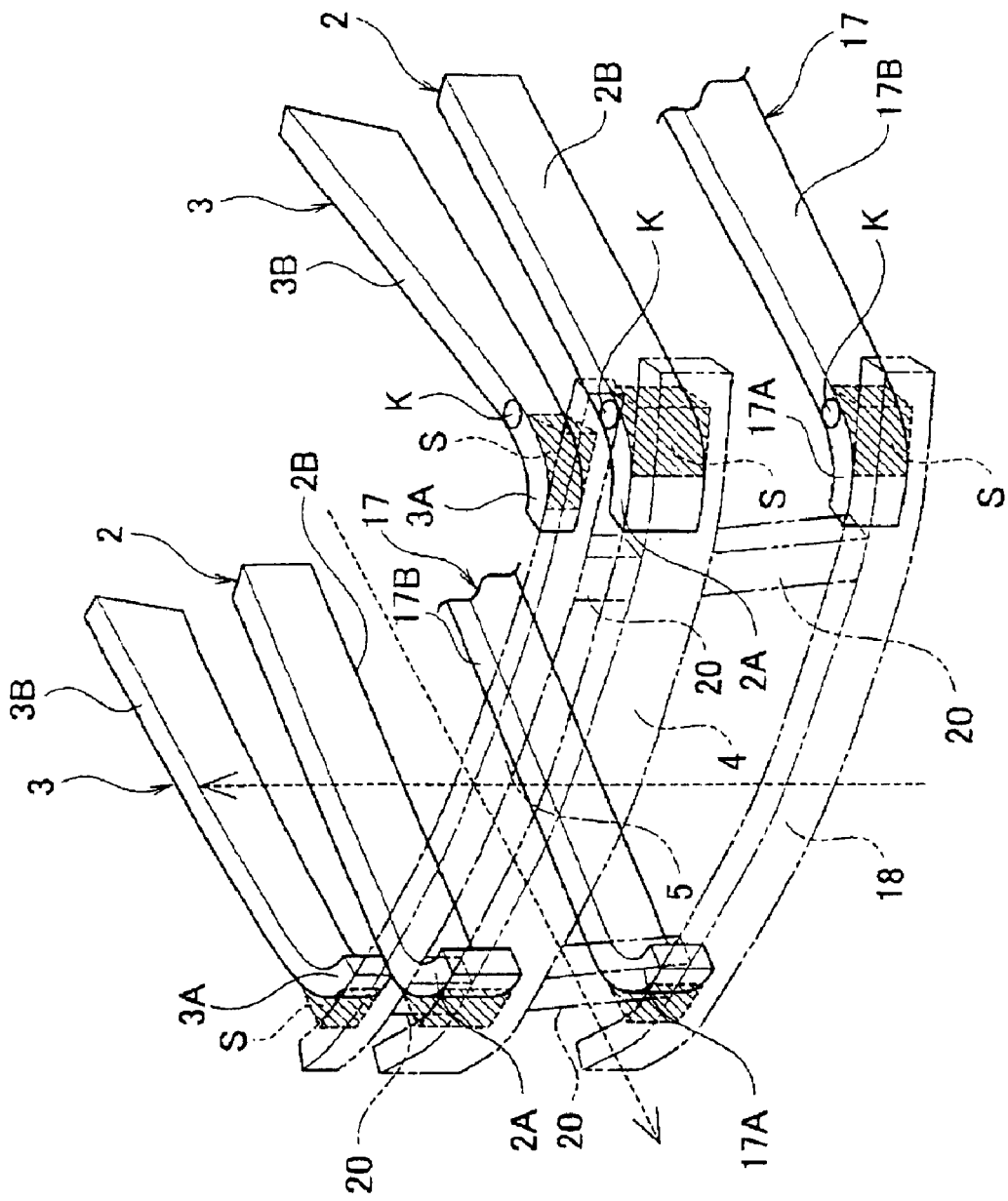
FIG. 2 is an enlarged partial perspective view of the front frame members of the vehicle body shown in FIG. 1 in accordance with the first embodiment of the present invention.
Figure 3:
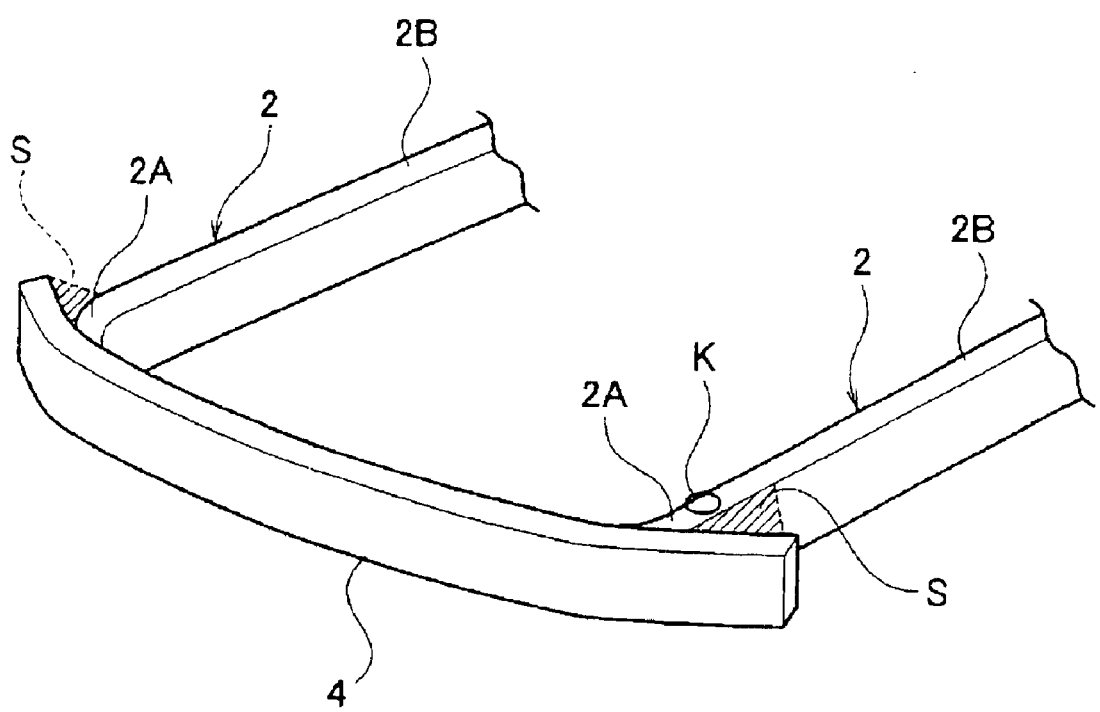
FIG. 3 is an enlarged partial perspective view of the center front side members and the center cross member of FIG. 2 in accordance with the first embodiment of the present invention.

The widthwise frame members, i.e., the center cross member 4, upper cross member 5, and lower cross member 18, are arranged such that their front edge positions are aligned vertically as shown in FIG. 2 and are connected together on both sides by vertical stay members 20. The front ends of the longitudinal frame members 2, 3 and 17 are connected to the back surfaces of the widthwise frame members 4, 5 and 18.

Figure 4:
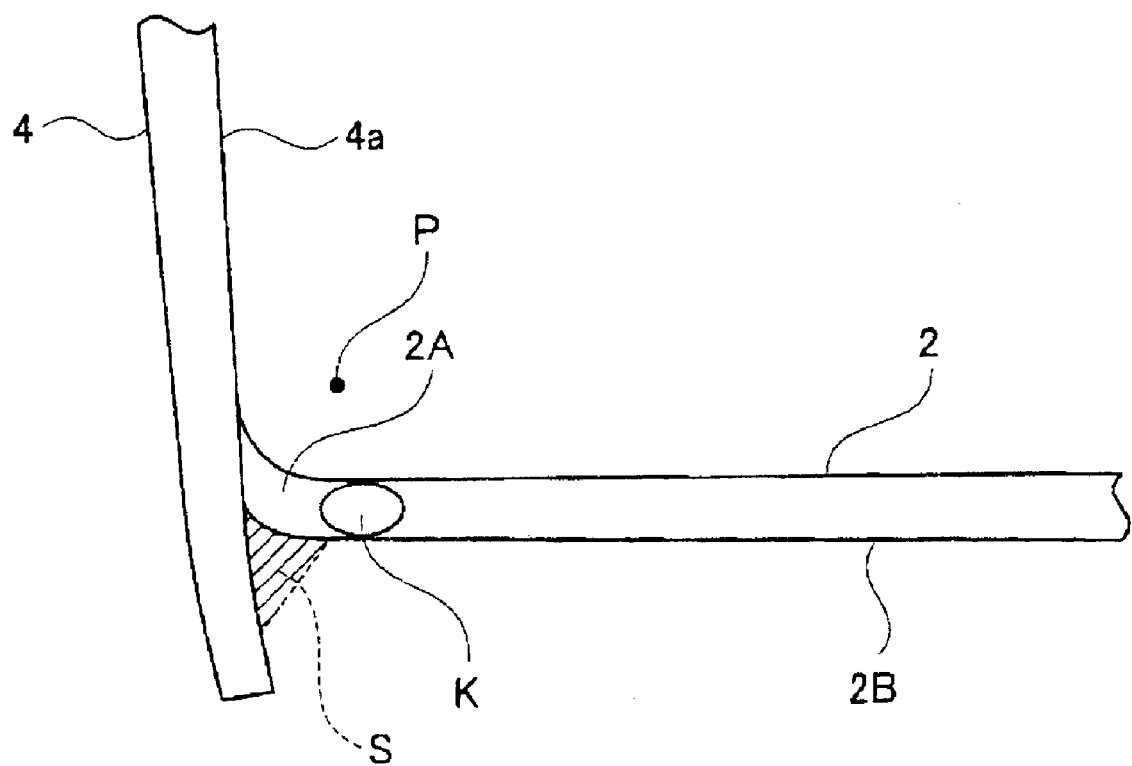
FIG. 4 is an enlarged partial plan view of a portion of one of the center front side members and the center cross member of FIGS. 1–3 in accordance with the first embodiment of the present invention.

Referring to FIGS. 2 and 4, the front end portions of the longitudinal frame members 2, 3, 17 are each provided with a curved part 2A, 3A and 17A that curves at a prescribed curvature about a curvature center P and constitutes the portion of the longitudinal frame member forward of a curvature transition point K established at a position rearward of the portion where the longitudinal frame member is joined to the widthwise frame member 4, 5 and 18. The curved parts 2A, 3A and 17A of those longitudinal frame members 2, 3 and 17 positioned vertically above and below one another are curved in the same direction. A wedge-shaped open space S is formed between the back surface 4a, 5a, 18a of each widthwise frame member 4, 5 and 18 and the wall surface of each curved part 2A, 3A and 17A that faces the back surface. In this embodiment, the curved parts 2A, 3A and 17A all curve inward in the widthwise direction of the vehicle from the curvature transition points K.

FIGS. 3 to 10 illustrate various connection structures of the front side members 2 and the center cross members 4 as representative examples. Similar structures are also used for the other longitudinal frame members and widthwise frame members, i.e., the hood ledge members 3, the upper cross member 5, the side frames 17, and the lower cross member 18.

Figure 5:
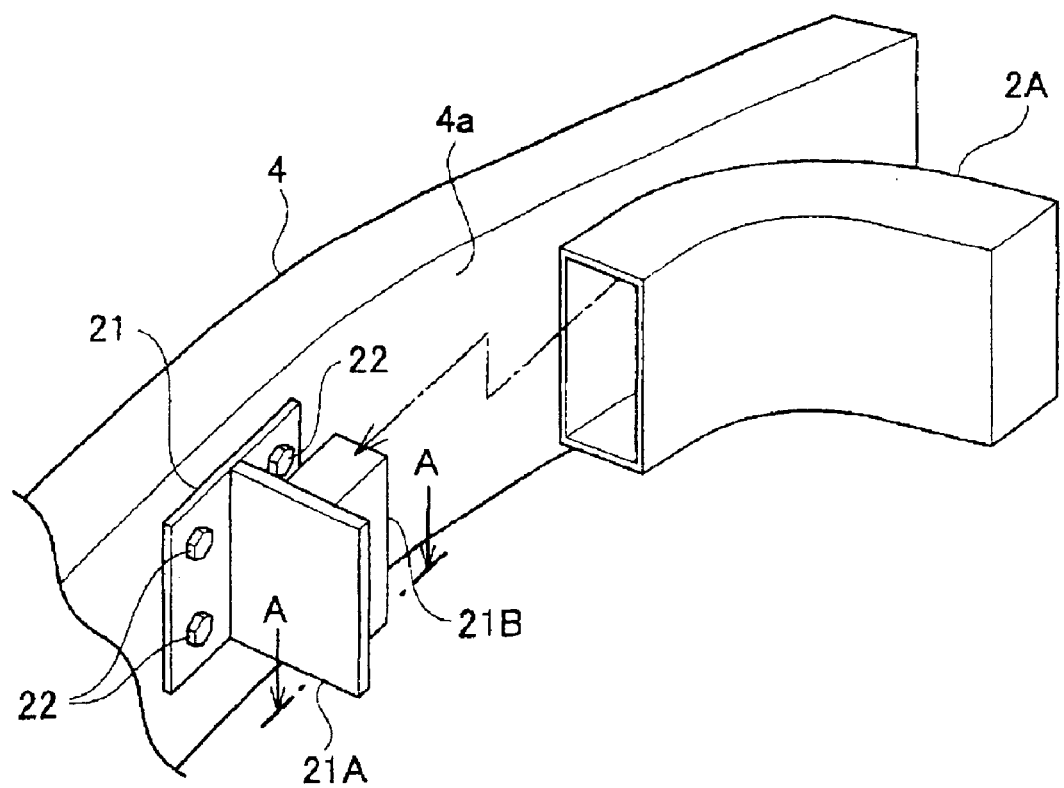
FIG. 5 is an enlarged partial perspective view of one of the center front side members and the center cross member being connected in accordance with the first embodiment of the present invention.
Figure 6:
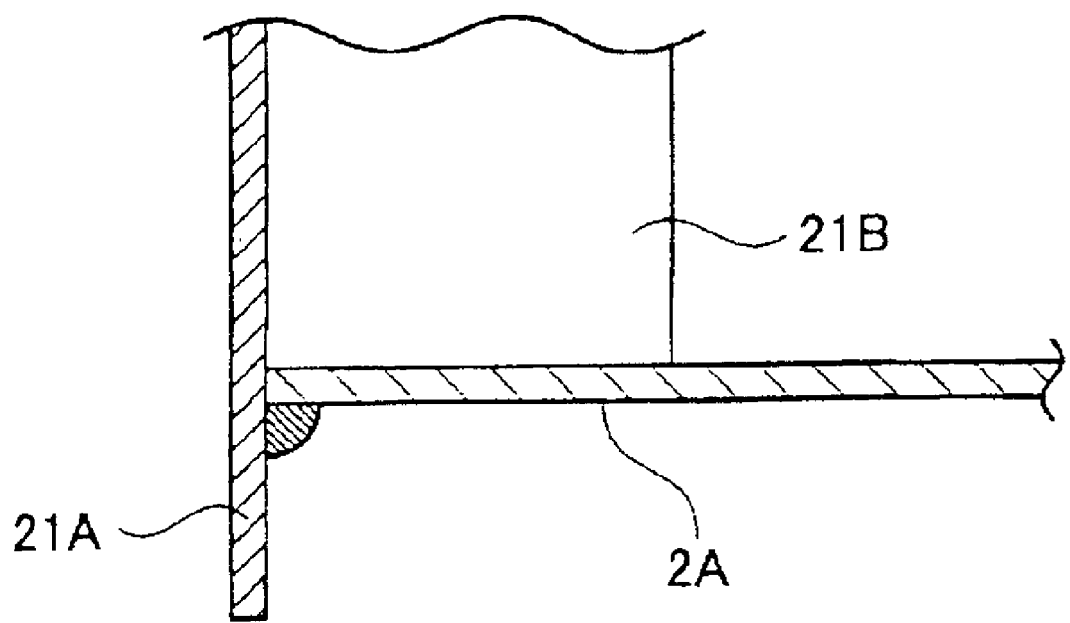
FIG. 6 is a partial cross sectional view of the connection between one of the center front side members and the center cross member as seen along section line A—A of FIG. 5 after the center cross member has been connected (e.g., welded) to the center front side member.

In the examples shown in FIGS. 5 and 6, each front side member 2 is connected to the center cross member 4 by fastening a bracket 21 that is T-shaped in a plan view to the back surface of the center cross member 4 with bolts 22. A plug part 21B that protrudes from a lateral face of a bearing piece 21A of the bracket 21 is fitted into the terminal opening of the curved part 2A. Each front side member 2 is fixed to the corresponding bracket 21 by welding the perimeter of the terminal opening to the bearing piece 21A.

Figure 7:
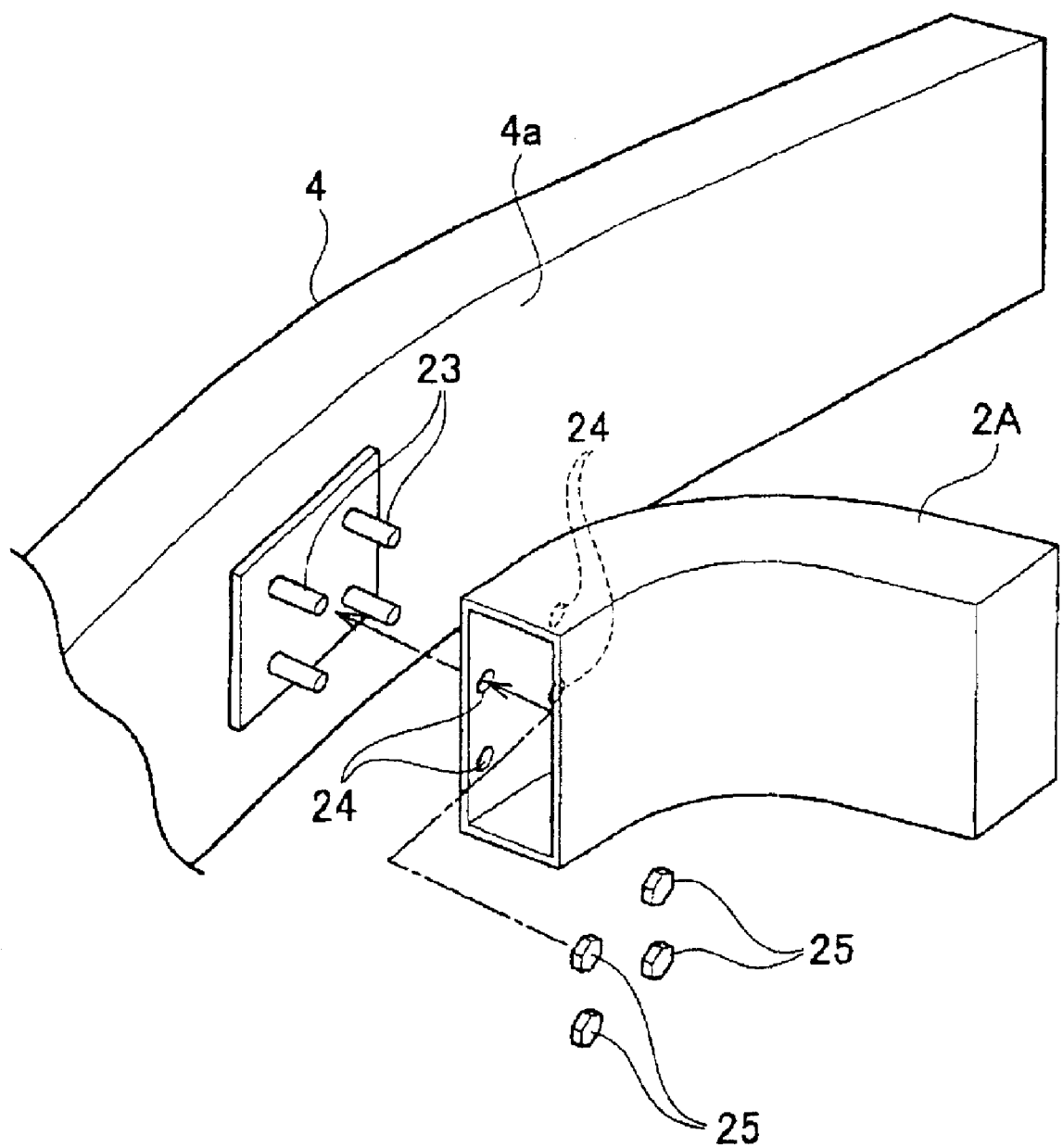
FIG. 7 is an enlarged partial perspective view of a modified connection between one of the center front side members and the center cross member in accordance with another aspect the present invention.

In the example shown in FIG. 7, each front side member 2 is connected to the center cross member 4 by providing a plurality of stud bolts 23 in the back surface of the center cross member 4, passing the stud bolts 23 through a plurality of corresponding bolt holes 24 provided in the opposing surface of the curved part 2A, and fastening with nuts 25.

Figure 8:
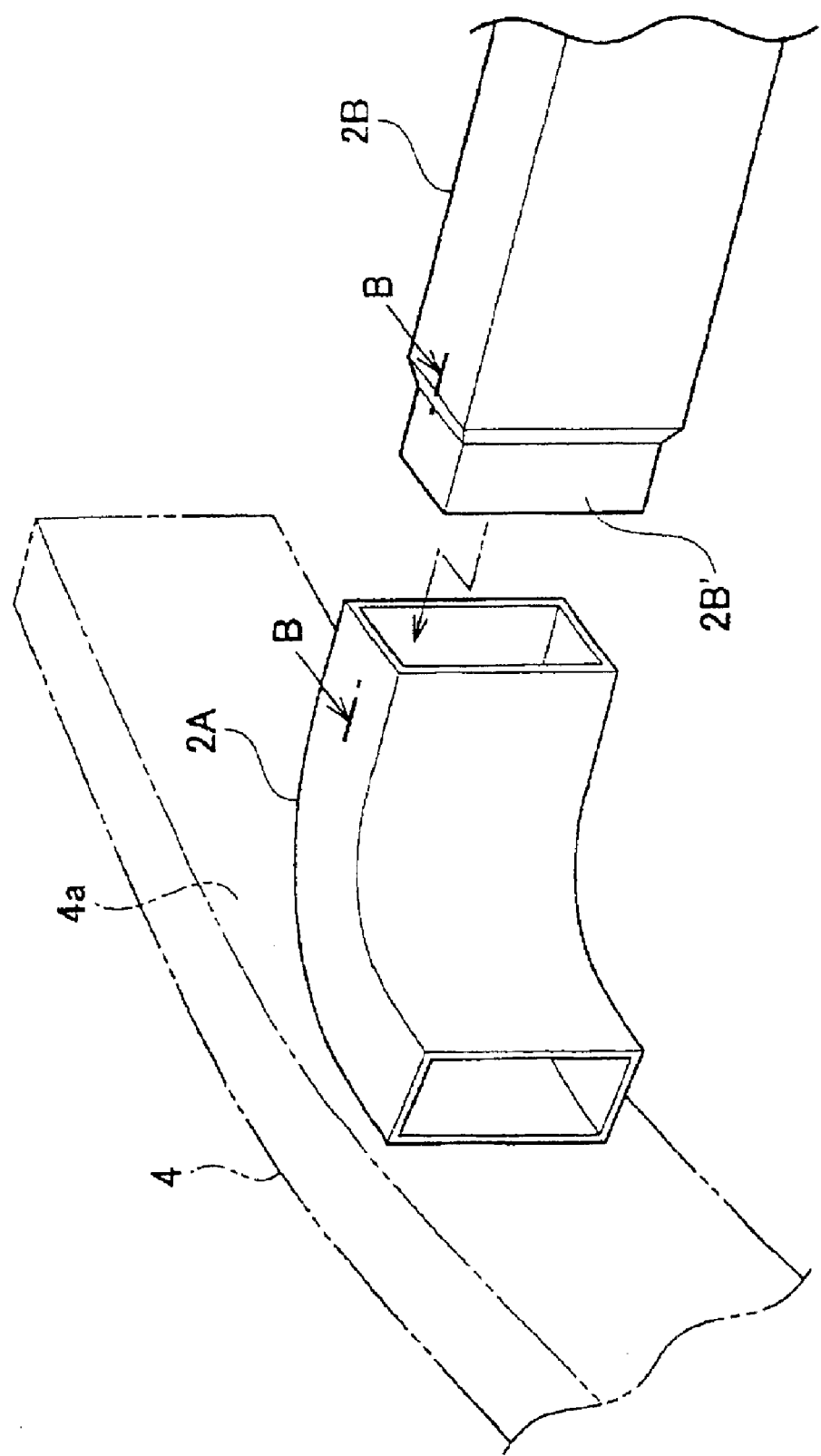
FIG. 8 is an enlarged partial perspective view of a modified end portion of the center front side member where the curved part and the main part of the front side member are connected in accordance with another aspect of the present invention.
Figure 9:
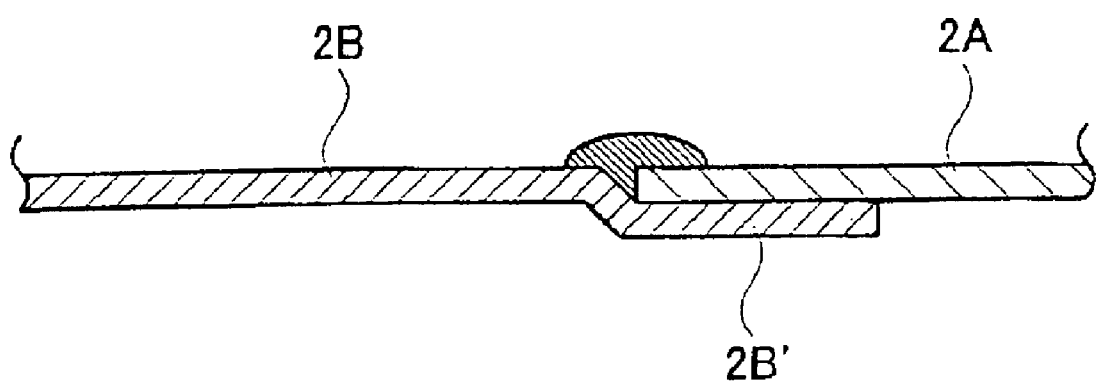
FIG. 9 is a enlarged partial cross sectional view taken along section line B—B of FIG. 8 in accordance with the present invention.
Figure 10:
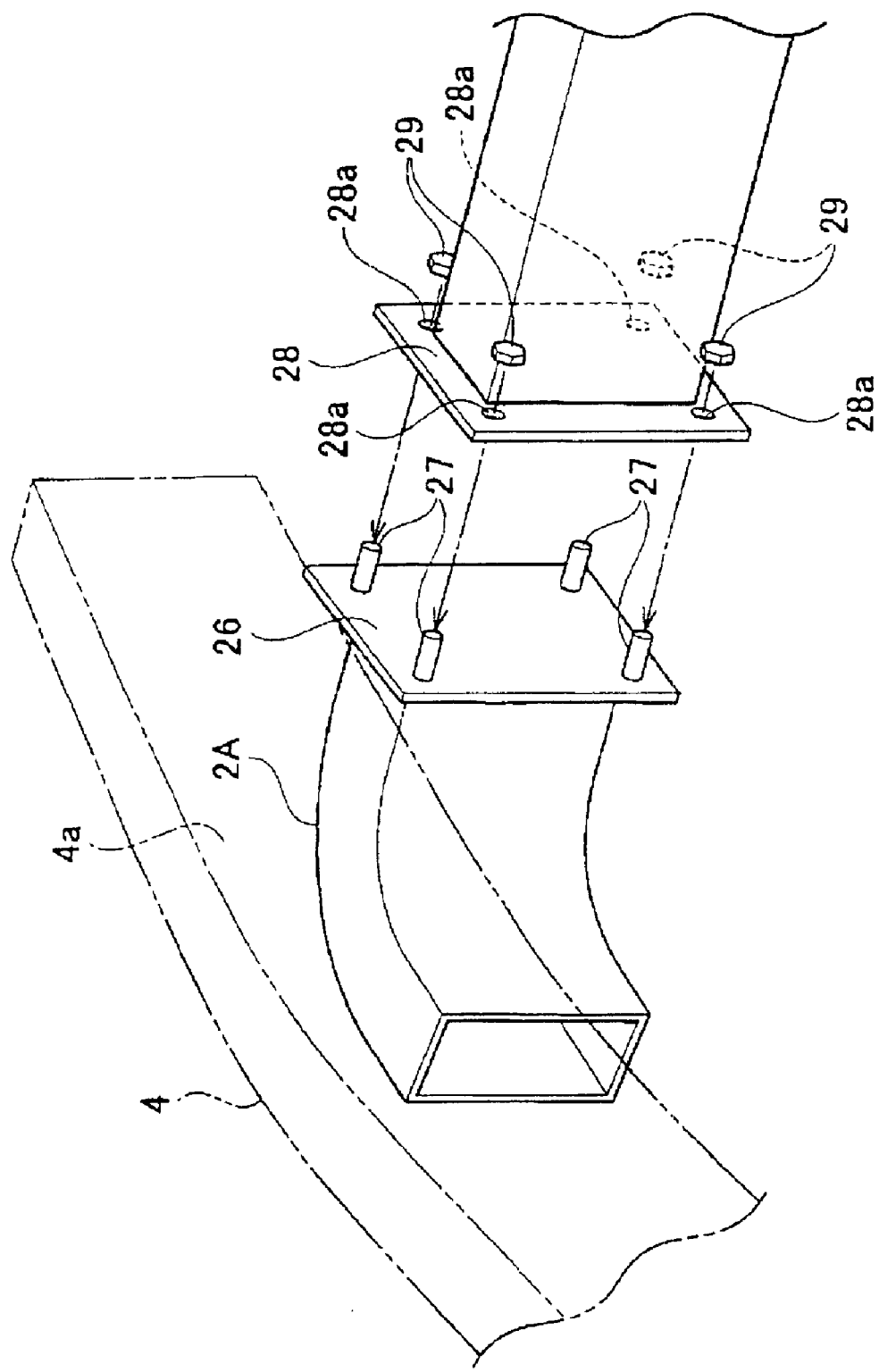
FIG. 10 is an enlarged partial perspective view of another modified end portion of the center front side member where the curved part and the main part of the front side member are connected in accordance with another aspect of the present invention.

Although it is acceptable for the curved part 2A of each front side member 2 to be formed integrally with the main part 2B, the examples shown in FIGS. 8 to 10 are configured such that the curved part 2A is a separate entity from the main part 2B and is connected to the front end portion of the main part 2B in, for example, the vicinity of the curvature transition point K.

In the examples shown in FIGS. 8 and 9, the front end of the main part 2B steps down by a dimension approximately equal to the wall thickness of the curved part 2A so as to form a small-sized part 2B'. The curved part 2A and the main part 2B are connected together by fitting the small-sized part 2B' into the rear terminal opening of the curved part 2A and welding around the perimeter of the rear terminal opening of the curved part 2A.

In the example shown in FIG. 10, an end cap 26 is provided with a plurality of protruding stud bolts 27 such that the end cap 26 is fixed to the rearward end of the curved part 2A, which has an end cap 28 with a plurality of bolt holes 28a. The curved part 2A and the main part 2B are connected together by passing the stud bolts 27 through the bolt holes 28a, mating the end caps 26 and 28 together, and fastening with nuts 29.

Meanwhile, at least the two end parts of each widthwise frame member (i.e., the center cross member 4, the upper cross member 5, and the lower cross member 18), where the curved parts 2A, 3A and 17A of the longitudinal members (i.e., the front side members 2, hood ledge members 3, and side frames 17) are connected, are so formed as to curve in the rearward direction of the vehicle in a plan view.

In the structure of this embodiment, the vertically arranged pairs of longitudinal frame members, i.e., the front side members 2, the hood ledge members 3, and the side frames 17, are configured such that their front end portions have curved parts 2A, 3A and 17A and the curved parts of longitudinal frame members positioned vertically above and below one another are provided with curvatures oriented in the same direction. Consequently, when the vehicle undergoes a front collision, the front end portions of the longitudinal frame members gradually undergo bending deformation while being folded over toward the opposite side as the side on which the center of curvature is located. The collision contact surface area increases in the direction of the bending deformation and the load is dispersed in the direction in which this contact area increases.

Figure 11:
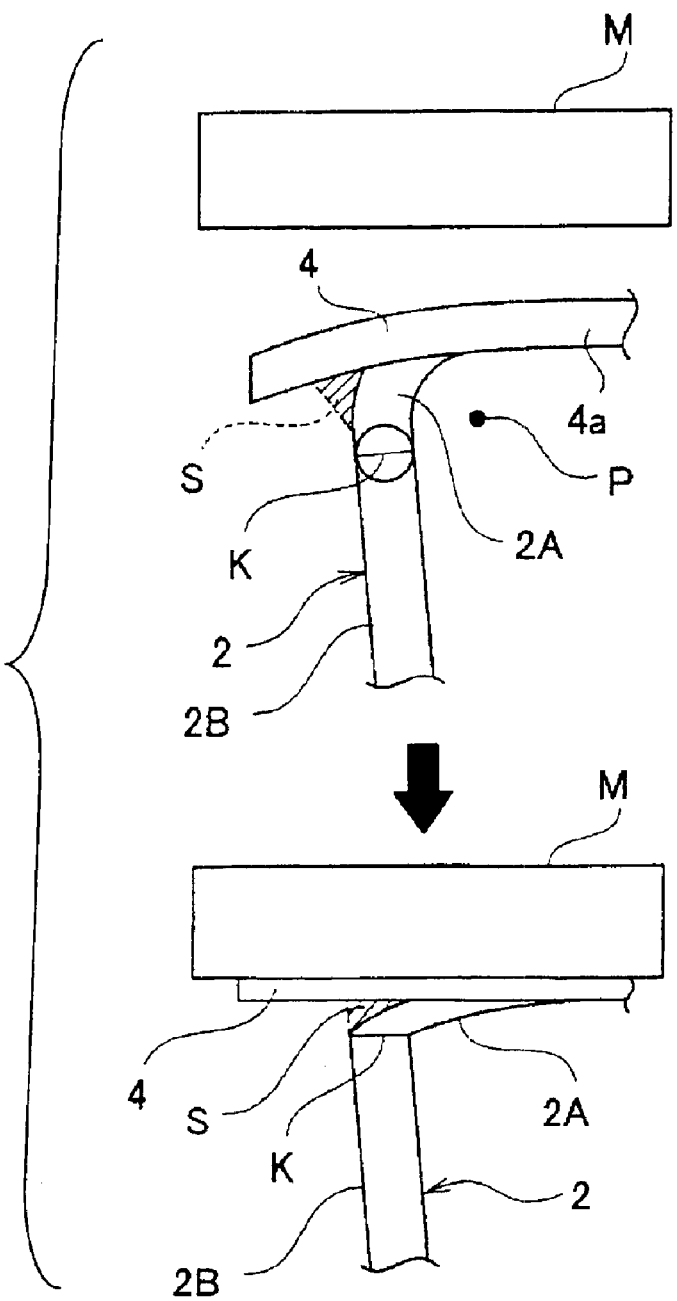
FIG. 11 is a partial top schematic plan view of the front frame members of the vehicle body constructed according to FIGS. 1–10 and that illustrates the operation of the front frame members of the vehicle body in accordance with the present invention.
Figure 12:
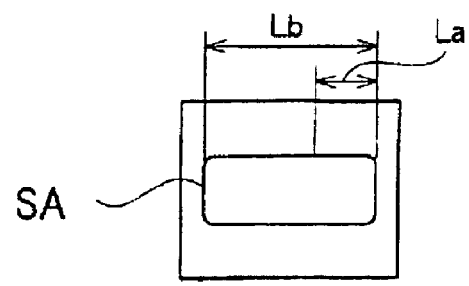
FIG. 12 is a partial schematic view of the one front side members of the vehicle body constructed according to FIGS. 1–10 in accordance with the present invention.

Looking, for example, at the front side members 2, which are the longitudinal frame members functioning as the main members for absorbing collision energy, the front ends thereof are connected to the back surface 4a of the center cross member 4 (which is a widthwise frame member) and a wedge-shaped open spaces S exists between the back surface 4a and the opposing wall surface of each curved part 2A. In other words, using the center cross member 4 and the front side members 2 as representative examples, the interaction between the widthwise frame members and longitudinal frame members during a front collision will be explained. The structure of this embodiment is contrived such that a wedge-shaped open space S exists between the back surface 4a of the center cross member 4 and the wall surface of the curved part 2A of each front side member 2 that faces the back surface 4a. Consequently, when the vehicle undergoes a front collision, the members change from the state shown part (A) of FIG. 11 to the state shown in part (B). More specifically, the rearward collapsing of the center cross member 4 causes the curved part 2A to gradually undergo bending deformation while being folded over in such a manner that the wall surface thereof that faces the back surface 4a touches against the back surface 4a. The collision contact surface area SA at a portion of the opposite side of the curved part 2A as the side where the curvature center P exists expands reliably from La to Lb (FIG. 11). The load is dispersed in the direction in which this contact area SA increases and can be prevented from concentrating in the axial direction of the front side members 2.

In contrast to the present invention, when the front side members are straight all the way to the tip end thereof and this tip end is connected to the back surface of the center cross member, then the center cross member collapses rearward in a bellows-like manner during a front collision. In other words, the tip portion of the front side members undergo buckling deformation in a bellows-like manner in the axial direction and the collision contact surface area of the front end of the front side members remains almost unchanged. Thus, the load tends to concentrate in the axial direction of the front side members in a conventional front end construction.

In this embodiment, the collision contact surface area expansion action that occurs at the front ends of the longitudinal frame members as just described also occurs in exactly the same manner in the hood ledge members 3 and the side frames 17 of the sub frame 16. In other words, the front ends of the hood ledge members 3 and the side frames 17 are also connected to the back surfaces of the upper cross member 5 and the lower cross member 18, respectively. Since the relationships between and the structures of these members are the same as those between/of the front side members 2 and the center cross member 4, the collision contact surface area expansion action just described occurs in exactly the same manner in the hood ledge members 3 and the side frames 17.

As a result, the curved parts 2A, 3A and 17A undergo bending deformation during the initial stage of a collision with a colliding object M. After the curved parts 2A, 3A and 17A have bent to the curvature transition points K, the main parts 2B, 3B and 17B begin to undergo axial buckling deformation in a bellows-like manner. The collision energy is absorbed efficiently by the bending deformation and axial collapse deformation.

Moreover, since concentration of the load in the axial direction of the longitudinal frame members 2, 3 and 17 is avoided, the degree of damage to the front section of the vehicle body can be suppressed and, when the colliding object M is another vehicle, the degree of damage to the other vehicle can also be suppressed.

Also, since the curved parts 2A, 3A and 17A undergo bending deformation at the portions thereof that correspond to the wedge-shaped open spaces S and the collision contact surface area can expand on the side facing the open space S, the axial load can be reliably transmitted to the longitudinal frame members 2, 3 and 17 due to the expansion of the collision surface area even when the collision involves a small overlap rate between the longitudinal frame members of the two vehicles, thus enabling an efficient collision energy absorbing function to be achieved.

More specifically, since the curved parts 2A, 3A and 17A in this embodiment are so formed as to curve inward in the widthwise direction of the vehicle from the curvature transition points K, even if the longitudinal frame members of the other vehicle are located further to the outside in the widthwise direction than the longitudinal frame members 2, 3 and 17 of the vehicle in which this embodiment is employed, the bending deformation of the curved parts 2A, 3A and 17A will cause the collision contact surface area to expand toward the outside in the widthwise direction over time. As a result, the axial load can act on the longitudinal frame members of both vehicles in a stable manner.

Additionally, since in this embodiment the end portions of the widthwise frame members 4, 5 and 18 are curved in the rearward direction of the vehicle in a plan view, the expansion of the collision contact surface area outward in the widthwise direction of the vehicle can be accomplished even better. In the present invention, wedge-shaped open spaces exist between the forward-facing wall surfaces of the curved parts of the longitudinal members and the portions of the back surface of the widthwise member that face the forward facing wall surfaces of the curved parts. Consequently, when the vehicle undergoes a front collision, the rearward collapsing of the widthwise frame members 4, 5 and 18 causes the curved parts 2A, 3A and 17A to gradually undergo bending deformation while being folded over in such a manner that the wall surfaces touch the back surfaces of the widthwise frame members 4, 5 and 18. The collision contact surface area increases at the portions of the curved parts 2A, 3A and 17A on the opposite sides thereof as the side where the centers of curvature exist. In other words, the load is dispersed in the direction in which this contact area increases and can be prevented from concentrating in the axial direction of the longitudinal frame members.

In addition to these collision performance related effects, the curved parts 2A, 3A and 17A can easily be formed to the desired curvature in accordance with the required properties because the curved parts 2A, 3A and 17A are formed as separate entities from the main parts 2B, 3B and 17B, to which they are connected in the vicinity of the curvature transition points K.

Moreover, in the present invention, the vertically arranged pairs of longitudinal frame members are configured such that longitudinal frame members positioned vertically above and below one another are provided at their front end portions with curvatures oriented in the same direction. Consequently, when the vehicle undergoes a front collision, the front end portions of the longitudinal frame members gradually undergo bending deformation while being folded over toward the opposite side as the side on which the center of curvature is located. The collision contact surface area increases in the direction of the bending deformation and the load is dispersed in the direction in which this contact area increases.

Second Embodiment

Figure 13:
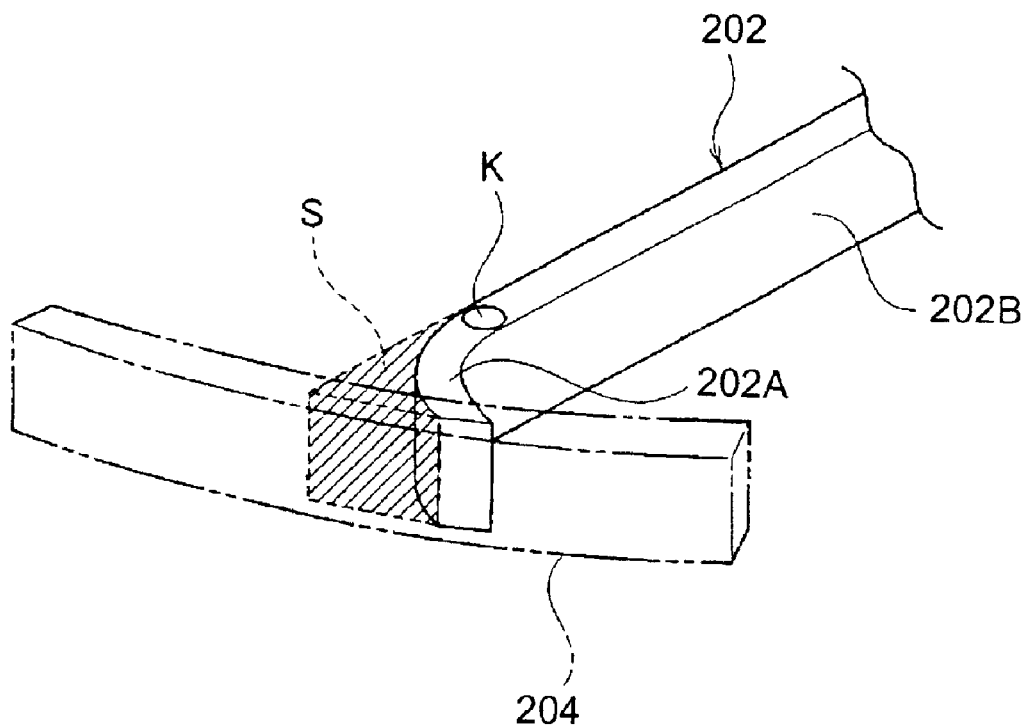
FIG. 13 is an enlarged partial perspective view of a front side member and a cross member in accordance with a second embodiment of the present invention.

Referring now to FIG. 13, a portion of a vehicle body front section structure in accordance with a second embodiment will now be explained. Basically, the vehicle body front section structure of this second embodiment is identical to the first embodiment, except for using a pair of front side members 202 (only one illustrated) that are coupled to a center cross member 204 such that the curve parts 202A curve in the opposite direction to the first embodiment. In other words, in this second embodiment, the curved parts 202A of the front side members 202 are so formed as to curve outward in the widthwise direction of the vehicle from the curvature transition points K. The other constituent features are the same as in the first embodiment. In this second embodiment, the front side members 202 serves as a longitudinal frame member and the cross member 204 serves as a widthwise frame member.

In view of the similarity between the first and second embodiments, the parts of the second embodiment that are identical to the parts of the first embodiment will be given the same reference numerals as the parts of the first embodiment. Moreover, the descriptions of the parts of the second embodiment that are identical to the parts of the first embodiment may be omitted for the sake of brevity.

Although FIG. 13 only illustrates one front side member 202 coupled to one end of center cross member 204, it will be apparent to those skilled in the art from this disclosure that the vehicle body front section structure of this second embodiment has a second front side member coupled to the other end of the center cross member 204 in the same manner (i.e., the second front side member is a mirror image of the front side member 202). Moreover, it will be apparent to those skilled in the art from this disclosure that the remaining structure of the vehicle body front section structure of this second embodiment is the same structure of the vehicle body front section structure of the first embodiment (i.e., the hood ledge panels 1, the hood ledge members 3, the upper cross member 5 and the subframe 16). In addition, the various connections between the front side members and the center cross member, as seen in FIGS. 5–10 are selectively used in the construction of the front side members 202 and the center cross member 204 of this second embodiment of the present invention.

Therefore, while the same operational effects as obtained with the first embodiment are obtained with the structure of the second embodiment, in this embodiment the wedge-shaped spaces S are formed on the inside relative to the widthwise direction of the vehicle and the bending deformation of the curved parts 202A causes the collision contact surface area to expand toward the widthwise middle. Thus, during a front collision, even if the front side members of the other vehicle are located further toward the middle in the widthwise direction than the front side members 202 of the vehicle in which this embodiment is employed, the bending deformation of the curved parts 202A will cause the collision contact surface area to expand toward the middle in the widthwise direction so that the axial load can act on the front side members of both vehicles in a stable manner.

Third Embodiment

Figure 14:
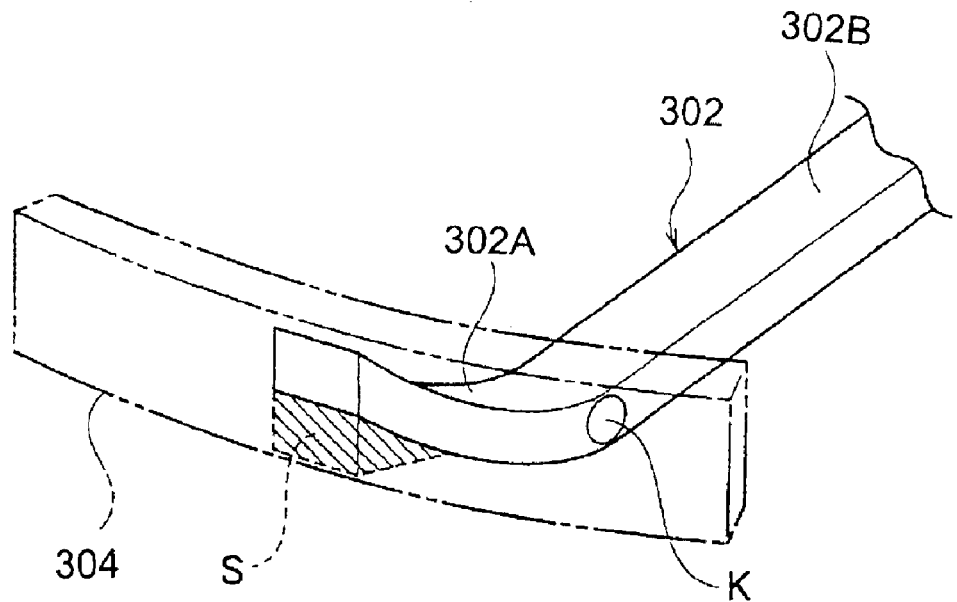
FIG. 14 is an enlarged partial perspective view of a front side member and a center cross member in accordance with a third embodiment of the present invention.

Referring now to FIG. 14, a portion of a vehicle body front section structure in accordance with a third embodiment will now be explained. Basically, the vehicle body front section structure of this third embodiment is identical to the first embodiment, except for using a pair of front side members 302 (only one illustrated) that are coupled to a center cross member 304 such that the curve parts 302A curve in an upward direction of the vehicle. In other words, in the third embodiment, the curved parts 303A of the front side members 303 are so formed as to curve upward from the curvature transition points K. The other constituent features are the same as in the first embodiment. In this third embodiment, the front side members 302 serves as a longitudinal frame member and the cross member 304 serves as a widthwise frame member.

In view of the similarity between the first and third embodiments, the parts of the third embodiment that are identical to the parts of the first embodiment will be given the same reference numerals as the parts of the first embodiment. Moreover, the descriptions of the parts of the third embodiment that are identical to the parts of the first embodiment may be omitted for the sake of brevity.

Although FIG. 14 only illustrates one front side member 302 coupled to one end of center cross member 304, it will be apparent to those skilled in the art from this disclosure that the vehicle body front section structure of this third embodiment has a second front side member coupled to the other end of the center cross member 304 in the same manner (i.e., the second front side member is a mirror image of the front side member 302). Moreover, it will be apparent to those skilled in the art from this disclosure that the remaining structure of the vehicle body front section structure of this third embodiment is the same structure of the vehicle body front section structure of the first embodiment (i.e., the hood ledge panels 1, the hood ledge members 3, the upper cross member 5 and the subframe 16). In addition, the various connections between the front side members and the center cross member, as seen in FIGS. 5–10 are selectively used in the construction of the front side members 302 and the center cross member 304 of this third embodiment of the present invention.

Therefore, while the same operational effects as obtained with the first embodiment are obtained with the structure of the third embodiment, in this embodiment the wedge-shaped spaces S are formed underneath and the bending deformation of the curved parts 303A causes the collision contact surface area to expand downward. Thus, during a front collision, even if the front side members of the other vehicle are located further downward than the front side members 303 of the vehicle in which this embodiment is employed, the bending deformation of the curved parts 302A will cause the collision contact surface area to expand downward so that the axial load can act on the front side members of both vehicles in a stable manner.

Fourth Embodiment

Figure 15:
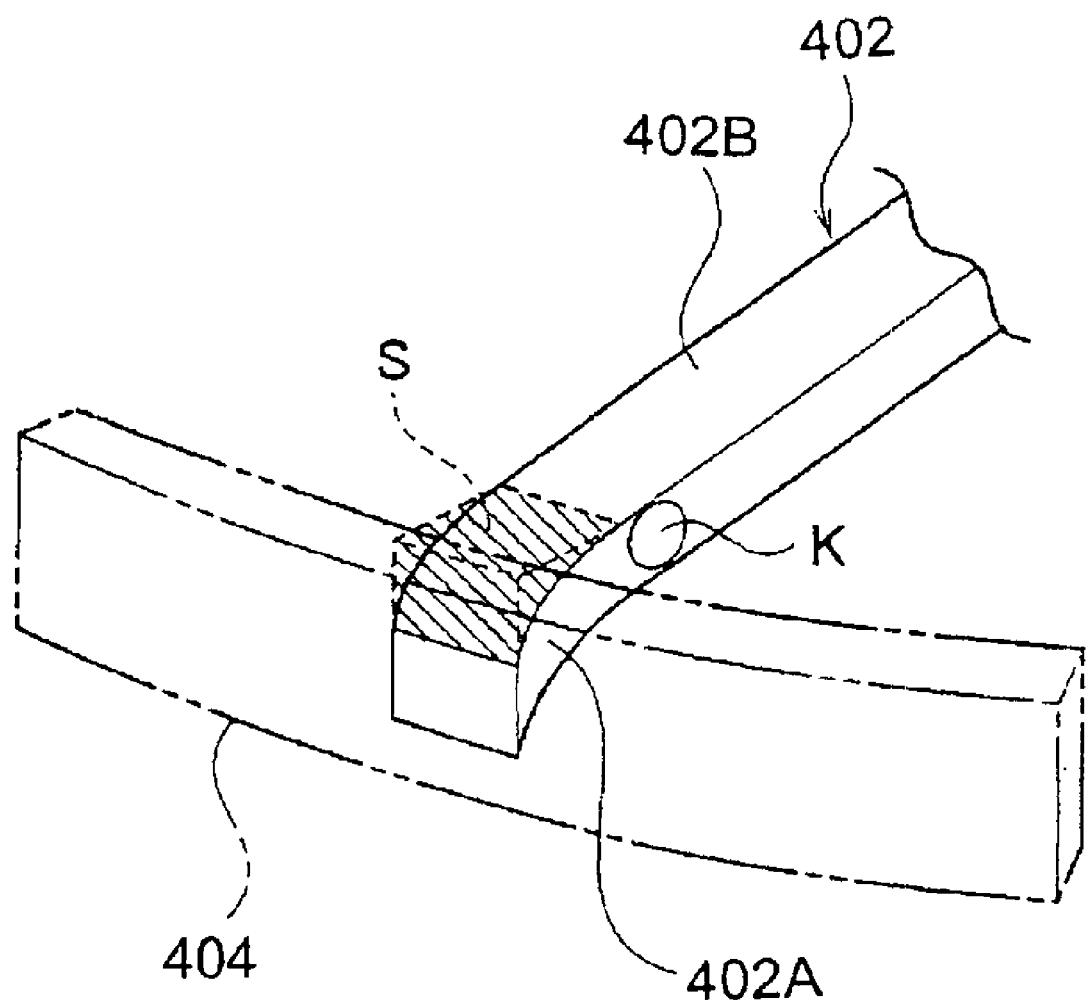
FIG. 15 is an enlarged partial perspective view of a front side member and a center cross member in accordance with a fourth embodiment of the present invention.

Referring now to FIG. 15, a portion of a vehicle body front section structure in accordance with a fourth embodiment will now be explained. Basically, the vehicle body front section structure of this fourth embodiment is identical to the first embodiment, except for using a pair of front side members 402 (only one illustrated) that are coupled to a center cross member 404 such that the curve parts 402A curve in a downward direction of the vehicle. In other words, in the fourth embodiment, the curved parts 403A of the front side members 403 are so formed as to curve downward from the curvature transition points K. The other constituent features are the same as in the first embodiment. In this fourth embodiment, the front side members 402 serves as a longitudinal frame member and the cross member 404 serves as a widthwise frame member.

In view of the similarity between the first and fourth embodiments, the parts of the fourth embodiment that are identical to the parts of the first embodiment will be given the same reference numerals as the parts of the first embodiment. Moreover, the descriptions of the parts of the fourth embodiment that are identical to the parts of the first embodiment may be omitted for the sake of brevity.

Although FIG. 15 only illustrates one front side member 402 coupled to one end of center cross member 404, it will be apparent to those skilled in the art from this disclosure that the vehicle body front section structure of this fourth embodiment has a second front side member coupled to the other end of the center cross member 404 in the same manner (i.e., the second front side member is a mirror image of the front side member 402). Moreover, it will be apparent to those skilled in the art from this disclosure that the remaining structure of the vehicle body front section structure of this fourth embodiment is the same structure of the vehicle body front section structure of the first embodiment (i.e., the hood ledge panels 1, the hood ledge members 3, the upper cross member 5 and the subframe 16). In addition, the various connections between the front side members and the center cross member, as seen in FIGS. 5–10 are selectively used in the construction of the front side members 402 and the center cross member 404 of this fourth embodiment of the present invention.

Therefore, while the same operational effects as obtained with the first embodiment are obtained with the structure of the fourth embodiment, in this embodiment the wedge-shaped spaces S are formed above and the bending deformation of the curved parts 402A causes the collision contact surface area to expand upward. Thus, during a front collision, even if the front side members of the other vehicle are located further upward than the front side members 402 of the vehicle in which this embodiment is employed, the bending deformation of the curved parts 402A will cause the collision contact surface area to expand downward so that the axial load can act on the front side members of both vehicles in a stable manner.

Fifth Embodiment

Figure 16:
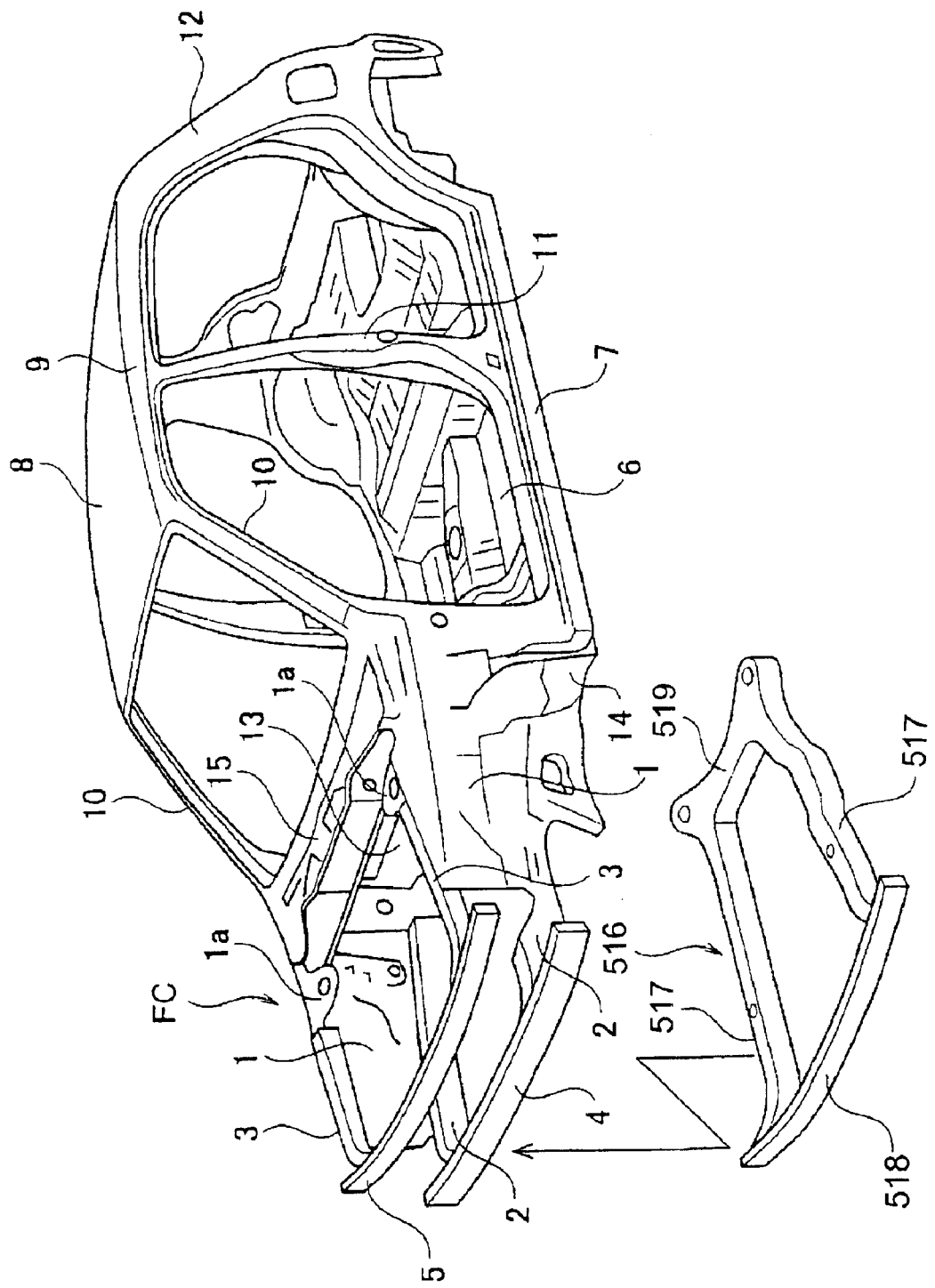
FIG. 16 is a perspective view of a vehicle body showing the vehicle body frame structure of an automobile in accordance with a fifth embodiment of the present invention.
Figure 17:
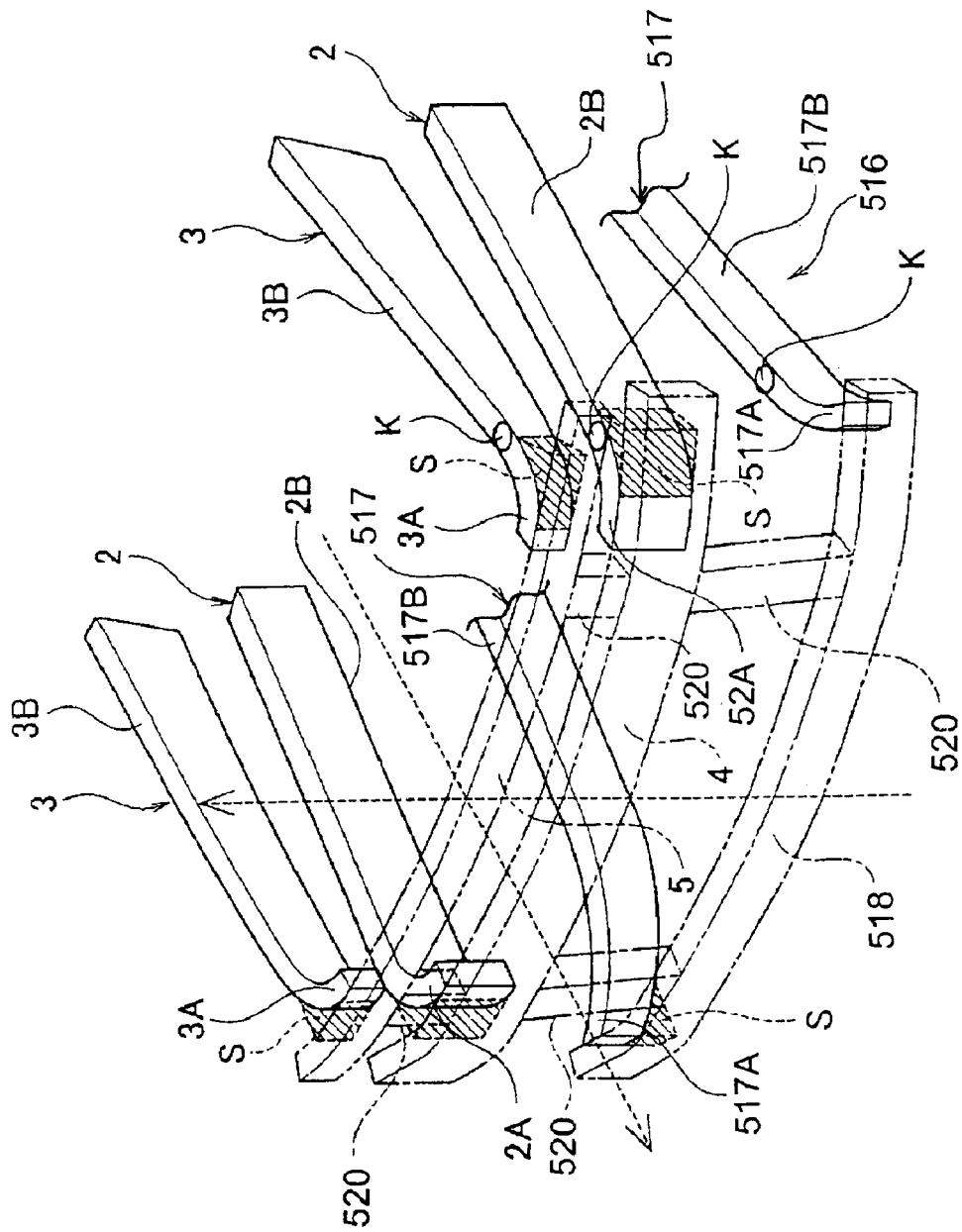
FIG. 17 is an enlarged partial perspective view of the front frame members of the vehicle body shown in FIG. 16 in accordance with the fifth embodiment of the present invention.

Referring now to FIGS. 16 and 17, a portion of a vehicle body front section structure in accordance with a fifth embodiment will now be explained. Basically, the vehicle body front section structure of this fifth embodiment is identical to the first embodiment, except for using a modified subframe 516 as explained below. The other constituent features are the same as in the first embodiment.

In view of the similarity between the first and fifth embodiments, the parts of the fifth embodiment that are identical to the parts of the first embodiment will be given the same reference numerals as the parts of the first embodiment. Moreover, the descriptions of the parts of the fifth embodiment that are identical to the parts of the first embodiment may be omitted for the sake of brevity.

The sub frame 516 basically includes left and right side frames 517 that serve as longitudinal frame members, and a lower cross member 518 that serves as a widthwise frame member and a rear frame 519. The lower cross member 518 is connected across the front ends of the left and right side frames 517. In this embodiment, the rear end parts of the left and right side frame members 517 are linked to the rear frame 519 to form a generally rectangular shape.

The front end portions of the longitudinal frame members 2, 3 and 517 are each provided with a curved part 2A, 3A and 517A that curves at a prescribed curvature about a curvature center P and constitutes the portion of the longitudinal frame member forward of a curvature transition point K established at a position rearward of the portion where the longitudinal frame member is joined to the widthwise frame member 4, 5 and 518. A wedge-shaped open space S is formed between the back surface 4a, 5a, 518a of each widthwise frame member 4, 5 and 518 and the wall surface of each curved part 2A, 3A and 517A that faces the back surface.

In this embodiment, the curved parts 2A and 3A curve inward in the widthwise direction of the vehicle from the curvature transition points K while the curved parts 517A curve outwardly from the curvature transition points K. Thus, the side frames 517 are configured such that, in a plan view, their forward portions spread outward at a prescribed angle in the widthwise direction of the vehicle. The curved parts 517A also curve outward in the widthwise direction of the vehicle from the curvature transition points K with a prescribed curvature. In a plan view, the curved parts 2A and 517A curve inward and outward (in the widthwise direction of the vehicle), respectively, so as to intersect each other.

More specifically, since the curvature direction of the curved parts 2A and 3A is different from the curvature direction of the curved parts 517A, the curved parts 2A and 3A and the curved parts 517A compensate for each others' weak points in terms of mechanical strength. In short the bending deformation action in the curvature direction of the curved parts 2A and 3A counterbalances against the bending deformation action in the curvature direction of the curved parts 517A, enabling the degree of damage to the front section of the vehicle to be suppressed even further.

Meanwhile, since the curved parts 517A are formed so as to curve upward from their respective curvature transition points K, even if the longitudinal frame members of the other vehicle are located further downward than the longitudinal frame members 517 of the vehicle in which this embodiment is employed, the bending deformation of the curved parts 517A will cause the collision contact surface area to expand downward over time. As a result, the axial load can act on the longitudinal frame members of both vehicles in a stable manner.

Since the curved parts 517A of this embodiment are also curved outward in the widthwise direction of the vehicle, when the other vehicle is located to the outside in the widthwise direction relative to the vehicle in which this embodiment is employed as discussed previously, the curved parts 517A supplement the collision center for the same reasons as discussed earlier and enable an efficient energy absorbing action to be achieved.

Sixth Embodiment

Figure 18:
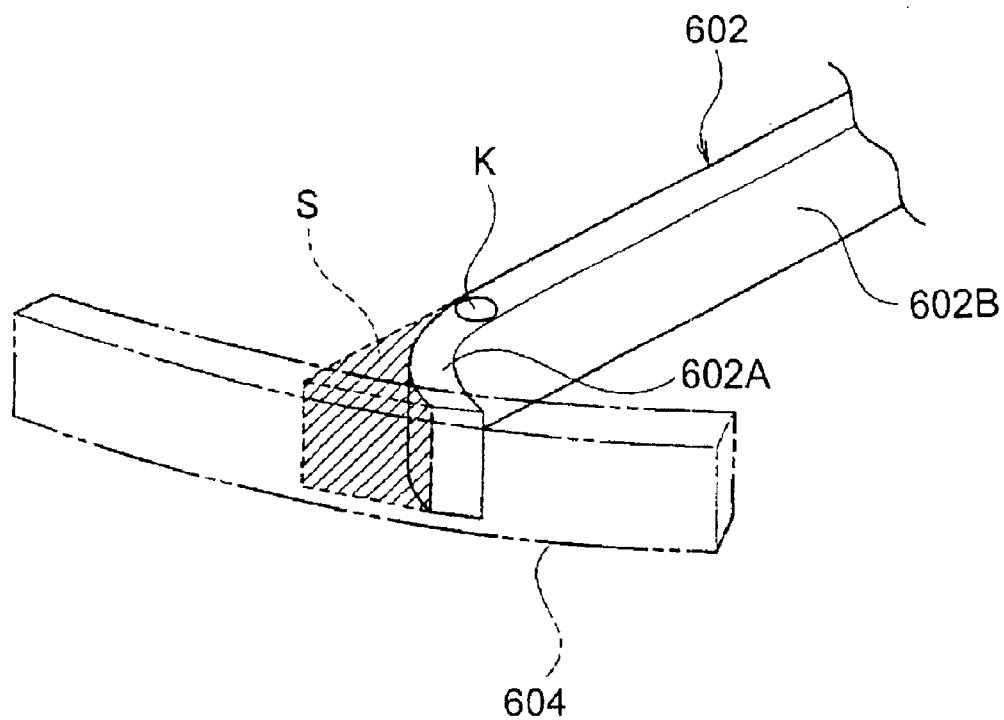
FIG. 18 is an enlarged partial perspective view of a front side member and a cross member in accordance with a sixth embodiment of the present invention.

Referring now to FIG. 18, a portion of a vehicle body front section structure in accordance with a sixth embodiment will now be explained. Basically, the vehicle body front section structure of this sixth embodiment is identical to the fifth embodiment, except for using a pair of front side members 602 (only one illustrated) that are coupled to a center cross member 604 such that the curve parts 602A curve in the opposite direction to the fifth embodiment. In other words, in this second embodiment, the curved parts 602A of the front side members 602 are so formed as to curve outward in the widthwise direction of the vehicle from the curvature transition points K. The other constituent features are the same as in the fifth embodiment. In this sixth embodiment, the front side members 602 serves as a longitudinal frame member and the cross member 604 serves as a widthwise frame member.

In view of the similarity between the fifth and sixth embodiments, the parts of the sixth embodiment that are identical to the parts of the fifth embodiment will be given the same reference numerals as the parts of the fifth embodiment. Moreover, the descriptions of the parts of the sixth embodiment that are identical to the parts of the fifth embodiment may be omitted for the sake of brevity.

Although FIG. 18 only illustrates one front side member 602 coupled to one end of center cross member 604, it will be apparent to those skilled in the art from this disclosure that the vehicle body front section structure of this sixth embodiment has a second front side member coupled to the other end of the center cross member 604 in the same manner (i.e., the second front side member is a mirror image of the front side member 602). Moreover, it will be apparent to those skilled in the art from this disclosure that the remaining structure of the vehicle body front section structure of this sixth embodiment is the same structure of the vehicle body front section structure of the fifth embodiment (i.e., the hood ledge panels 1, the hood ledge members 3, the upper cross member 5 and the subframe 516). In addition, the various connections between the front side members and the center cross member, as seen in FIGS. 5–10 are selectively used in the construction of the front side members 602 and the center cross member 604 of this sixth embodiment of the present invention.

Therefore, while the same operational effects as obtained with the fifth embodiment are obtained with the structure of the sixth embodiment, in this embodiment the wedge-shaped spaces S are formed on the inside relative to the widthwise direction of the vehicle and the bending deformation of the curved parts 602A causes the collision contact surface area to expand toward the widthwise middle. Thus, during a front collision, even if the front side members of the other vehicle are located further toward the middle in the widthwise direction than the front side members 602 of the vehicle in which this embodiment is employed, the bending deformation of the curved parts 602A will cause the collision contact surface area to expand toward the middle in the widthwise direction so that the axial load can act on the front side members of both vehicles in a stable manner.

In the present invention, the vertically arranged pairs of longitudinal frame members are configured such that the front end portion of each longitudinal frame member is provided with a curvature and the curvature provided on the front end portions of at least one pair of longitudinal frame members is oriented in a different direction that of the other pairs. Consequently, when the vehicle undergoes a front collision, the front end portions of the longitudinal frame members gradually undergo bending deformation while being folded over toward the opposite side as the side on which the center of curvature is located. The collision contact surface area increases in the direction of the bending deformation and the load is dispersed in the direction in which this contact area increases. Furthermore, since the curvatures of the pairs are oriented in different directions, they compensate for each others' weak points in terms of mechanical strength.

More specifically, since the front ends of at least one pair of longitudinal frame members are connected to a back surface of a widthwise frame member, the aforementioned bending deformation proceeds in such a manner that the front ends of the longitudinal frame members touch against the back surface of the widthwise frame member and the collision contact surface area can be increased reliably. By applying this arrangement to the main longitudinal frame members for absorbing collision energy, the load can be prevented from concentrating in the axial direction of the main longitudinal frame members and the degree of damage to the front section of the vehicle can be suppressed.

Seventh Embodiment

Figure 19:
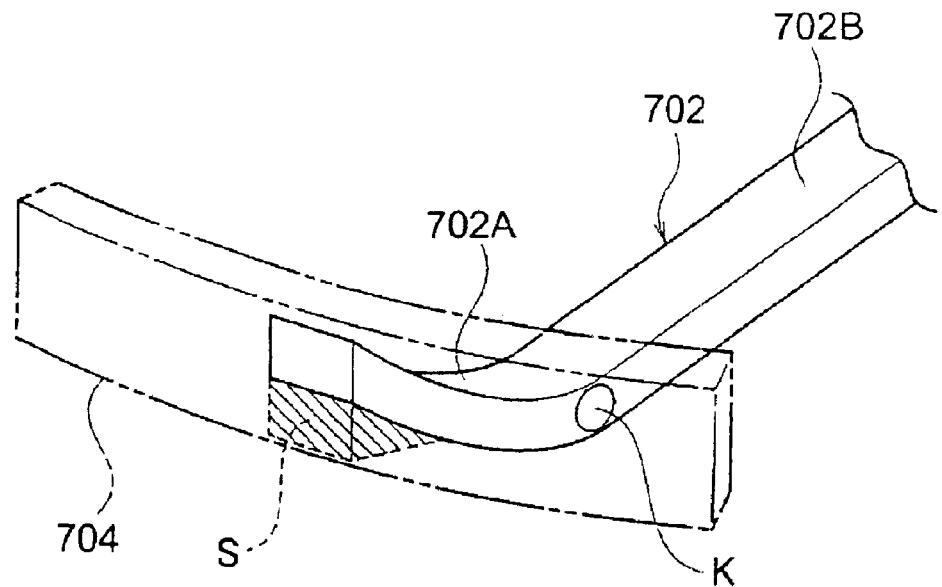
FIG. 19 is an enlarged partial perspective view of a front side member and a center cross member in accordance with a seventh embodiment of the present invention.

Referring now to FIG. 19, a portion of a vehicle body front section structure in accordance with a seventh embodiment will now be explained. Basically, the vehicle body front section structure of this seventh embodiment is identical to the fifth embodiment, except for using a pair of front side members 702 (only one illustrated) that are coupled to a center cross member 704 such that the curve parts 702A curve in an upward direction of the vehicle. In other words, in the seventh embodiment, the curved parts 703A of the front side members 703 are so formed as to curve upward from the curvature transition points K. The other constituent features are the same as in the fifth embodiment. In this seventh embodiment, the front side members 702 serves as a longitudinal frame member and the cross member 704 serves as a widthwise frame member.

In view of the similarity between the fifth and seventh embodiments, the parts of the seventh embodiment that are identical to the parts of the fifth embodiment will be given the same reference numerals as the parts of the fifth embodiment. Moreover, the descriptions of the parts of the seventh embodiment that are identical to the parts of the fifth embodiment may be omitted for the sake of brevity.

Although FIG. 19 only illustrates one front side member 702 coupled to one end of center cross member 704, it will be apparent to those skilled in the art from this disclosure that the vehicle body front section structure of this seventh embodiment has a second front side member coupled to the other end of the center cross member 704 in the same manner (i.e., the second front side member is a mirror image of the front side member 702). Moreover, it will be apparent to those skilled in the art from this disclosure that the remaining structure of the vehicle body front section structure of this seventh embodiment is the same structure of the vehicle body front section structure of the fifth embodiment (i.e., the hood ledge panels 1, the hood ledge members 3, the upper cross member 5 and the subframe 516). In addition, the various connections between the front side members and the center cross member, as seen in FIGS. 5–10 are selectively used in the construction of the front side members 702 and the center cross member 704 of this seventh embodiment of the present invention.

Therefore, while the same operational effects as obtained with the fifth embodiment are obtained with the structure of the seventh embodiment, in this embodiment the wedge-shaped spaces S are formed underneath and the bending deformation of the curved parts 703A causes the collision contact surface area to expand downward. Thus, during a front collision, even if the front side members of the other vehicle are located further downward than the front side members 703 of the vehicle in which this embodiment is employed, the bending deformation of the curved parts 702A will cause the collision contact surface area to expand downward so that the axial load can act on the front side members of both vehicles in a stable manner.

Eighth Embodiment

Figure 20:
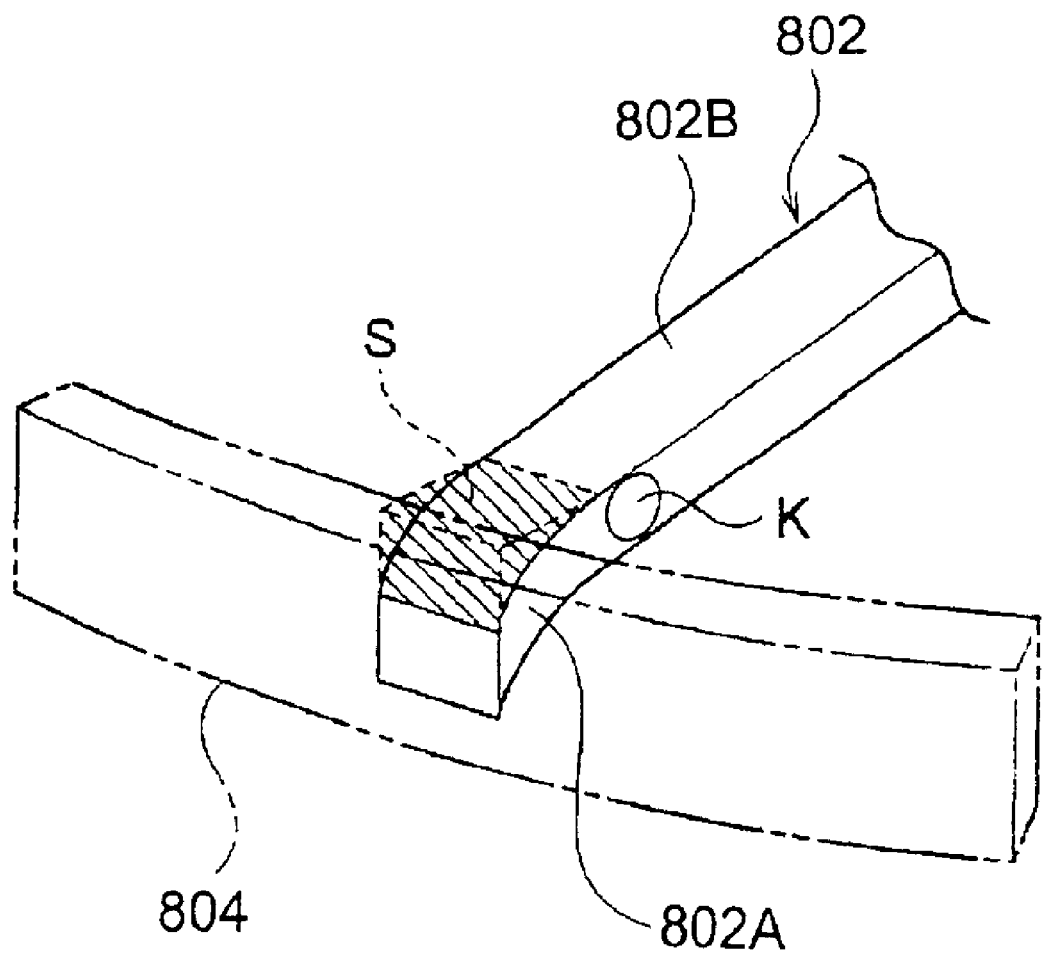
FIG. 20 is an enlarged partial perspective view of a front side member and a center cross member in accordance with an eighth embodiment of the present invention.

Referring now to FIG. 20, a portion of a vehicle body front section structure in accordance with an eighth embodiment will now be explained. Basically, the vehicle body front section structure of this eighth embodiment is identical to the fifth embodiment, except for using a pair of front side members 802 (only one illustrated) that are coupled to a center cross member 804 such that the curve parts 802A curve in a downward direction of the vehicle. In other words, in the eighth embodiment, the curved parts 803A of the front side members 803 are so formed as to curve downward from the curvature transition points K. The other constituent features are the same as in the fifth embodiment. In this eighth embodiment, the front side members 802 serves as a longitudinal frame member and the cross member 804 serves as a widthwise frame member.

In view of the similarity between the fifth and eighth embodiments, the parts of the eighth embodiment that are identical to the parts of the fifth embodiment will be given the same reference numerals as the parts of the fifth embodiment. Moreover, the descriptions of the parts of the eighth embodiment that are identical to the parts of the fifth embodiment may be omitted for the sake of brevity.

Although FIG. 20 only illustrates one front side member 802 coupled to one end of center cross member 804, it will be apparent to those skilled in the art from this disclosure that the vehicle body front section structure of this fourth embodiment has a second front side member coupled to the other end of the center cross member 804 in the same manner (i.e., the second front side member is a mirror image of the front side member 802). Moreover, it will be apparent to those skilled in the art from this disclosure that the remaining structure of the vehicle body front section structure of this eighth embodiment is the same structure of the vehicle body front section structure of the fifth embodiment (i.e., the hood ledge panels 1, the hood ledge members 3, the upper cross member 5 and the subframe 516). In addition, the various connections between the front side members and the center cross member, as seen in FIGS. 5–10 are selectively used in the construction of the front side members 802 and the center cross member 804 of this eighth embodiment of the present invention.

Therefore, while the same operational effects as obtained with the fifth embodiment are obtained with the structure of the eighth embodiment, in this embodiment the wedge-shaped spaces S are formed above and the bending deformation of the curved parts 802A causes the collision contact surface area to expand upward. Thus, during a front collision, even if the front side members of the other vehicle are located further upward than the front side members 802 of the vehicle in which this embodiment is employed, the bending deformation of the curved parts 802A will cause the collision contact surface area to expand downward so that the axial load can act on the front side members of both vehicles in a stable manner.

Ninth Embodiment

Figure 21:
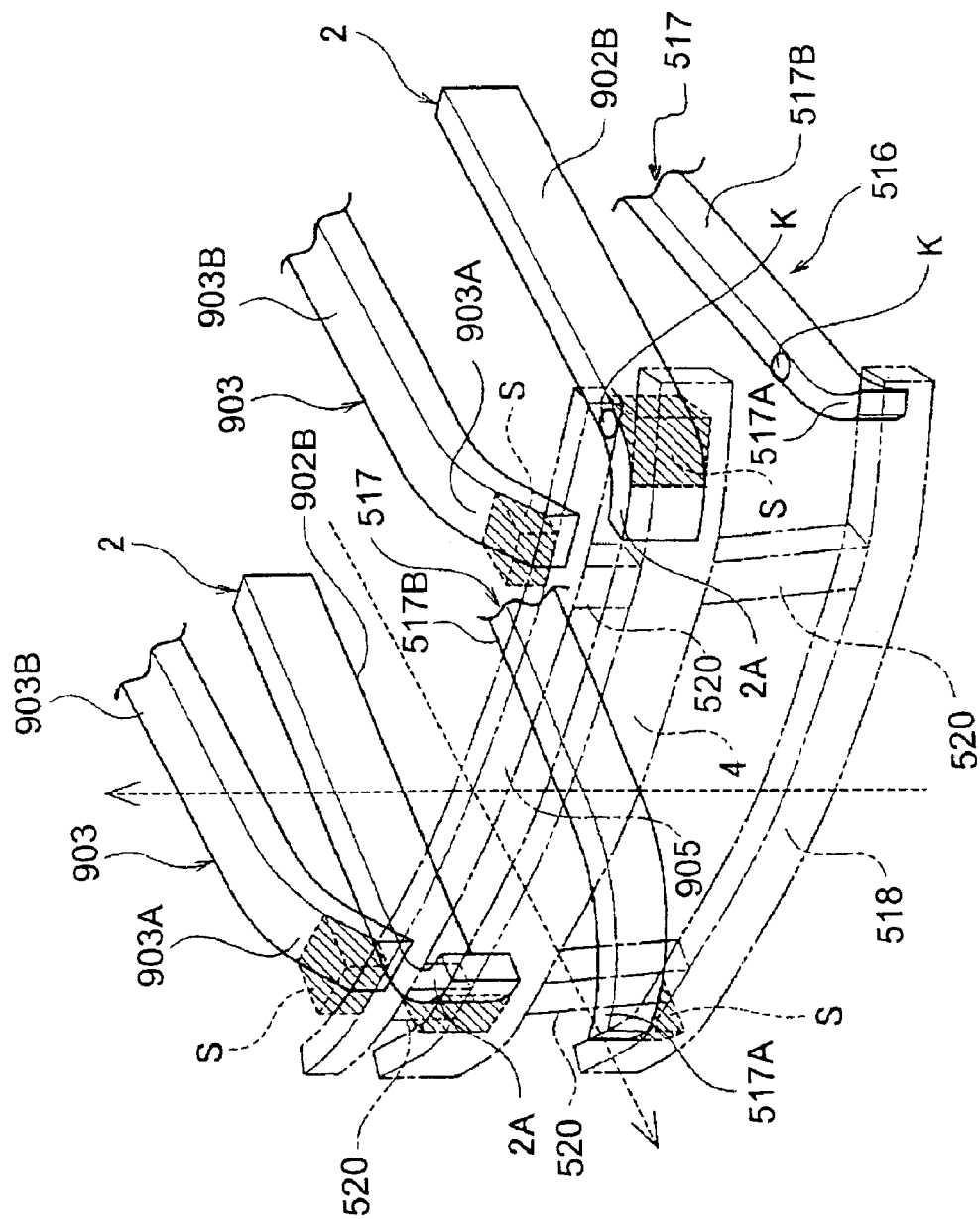
FIG. 21 is a perspective view of in accordance with a ninth embodiment of the present invention.

Referring now to FIG. 21, a portion of a vehicle body front section structure in accordance with a ninth embodiment will now be explained. Basically, the vehicle body front section structure of this ninth embodiment is identical to the fifth embodiment, except for using a pair of front side members 903 (only one illustrated) that are coupled to a center cross member 905 such that the curved parts 903A of the front side members 903 in this embodiment are formed so as to curve downward from the curvature transition points K. In other words, in the eighth embodiment, the curved parts 903A of the front side members 903 are so formed as to curve downward from the curvature transition points K. The other constituent features are the same as in the fifth embodiment. In this eighth embodiment, the front side members 903 serves as a longitudinal frame member and the cross member 905 serves as a widthwise frame member.

The same factors also apply to the hood ledge members 3. For example, in the ninth embodiment shown in FIG. 21, the curved parts 903A of the hood ledge member 903 are the same as in the fifth embodiment, except they are curved downward from the curvature transition points K similar to the eighth embodiment.

Therefore, when a vehicle employing this ninth embodiment undergoes a front collision, even if the hood ledge members of the other vehicle are located further upward than the hood ledge members 903 of the vehicle in which this embodiment is employed, the bending deformation of the curved parts 903A will cause the collision contact surface area to expand upward so that the axial load can act on the hood ledge members of both vehicles in a stable manner.

Also, while the front ends of the curved parts 903A of the hood ledge members 903 are connected to the rear surface of the upper cross member 905 in this embodiment, it is also acceptable to connect the same to the upper surface of the upper cross member 5 in order to accommodate moldmaking requirements.

As used herein, the following directional terms "forward, rearward, above, downward, vertical, horizontal, below and transverse" as well as any other similar directional terms refer to those directions of a vehicle equipped with the present invention. Accordingly, these terms, as utilized to describe the present invention should be interpreted relative to a vehicle equipped with the present invention. Moreover, terms that are expressed as "means-plus function" in the claims should include any structure that can be utilized to carry out the function of that part of the present invention. The terms of degree such as "substantially", "about" and "approximately" as used herein mean a reasonable amount of deviation of the modified term such that the end result is not significantly changed. For example, these terms can be construed as including a deviation of at least ±5% of the modified term if this deviation would not negate the meaning of the word it modifies.

This application claims priority to Japanese Patent Application Nos. 2003-059011, 2003-059016 and 2003-059023.

The entire disclosures of Japanese Patent Application Nos. 2003-059011, 2003-059016 and 2003-059023 are hereby incorporated herein by reference.

While only selected embodiments have been chosen to illustrate the present invention, it will be apparent to those skilled in the art from this disclosure that various changes and modifications can be made herein without departing from the scope of the invention as defined in the appended claims. Furthermore, the foregoing descriptions of the embodiments according to the present invention are provided for illustration only, and not for the purpose of limiting the invention as defined by the appended claims and their equivalents. Thus, the scope of the invention is not limited to the disclosed embodiments.

What is claimed is:

1. A vehicle body front section structure comprising:
    a pair of longitudinal frame members configured and arranged to extend in a lengthwise direction of a vehicle on both widthwise sides of a front compartment, each of the longitudinal frame members having a front end portion with a hollow, closed cross section curved part disposed forwardly of a curvature transition point; and
    a widthwise frame member having a back surface connected to the front end portions of the longitudinal frame members such that the widthwise frame member extends in the widthwise direction of the vehicle,
    the curved parts being disposed at locations rearward connection points between the longitudinal frame members and the widthwise frame member such that a pair of wedge-shaped open spaces are formed between the back surface of the widthwise frame member and corresponding wall surfaces of the curved parts that faces the back surface of the widthwise frame member, each of the curved parts having a load transmitting surface formed along a corresponding one of the wedge-shaped open spaces, with the load transmitting surfaces being configured and arranged to collapse sequentially against the widthwise frame member during a collision against the widthwise frame member.

2. The vehicle body front section structure recited in claim 1, wherein
    each of the curved parts is formed as a separate entity from a main part of the longitudinal frame member and is connected to a front end of the main part of the longitudinal frame member.

3. The vehicle body front section structure recited in claim 1, wherein
    the curved parts are configured and arranged to curve outward in the widthwise direction of the vehicle from the curvature transition points.

4. The vehicle body front section structure recited in claim 3, wherein
    at least two end parts of the widthwise frame member that are disposed outwardly of the connection points of the longitudinal members are configured and arranged to curve in the rearward direction of the vehicle in a plan view.

5. The vehicle body front section structure recited in claim 1, wherein
    the curved parts are configured and arranged to curve inward in the widthwise direction of the vehicle from the curvature transition points.

6. The vehicle body front section structure recited in claim 1, wherein
    the curved parts are configured and arranged as to curve downward from the curvature transition points.

7. A vehicle body front section structure comprising:
a pair of longitudinal frame members configured and arranged to extend in a lengthwise direction of a vehicle on both widthwise sides of a front compartment, each of the longitudinal frame members having a front end portion with a curved part disposed forwardly of a curvature transition point; and
a widthwise frame member having a back surface connected to the front end portions of the longitudinal frame members such that the widthwise frame member extends in the widthwise direction of the vehicle,
the curved parts being disposed at locations rearward connection points between the longitudinal frame members and the widthwise frame member such that a pair of wedge-shaped open spaces are formed between the back surface of the widthwise frame member and corresponding wall surfaces of the curved parts that faces the back surface of the widthwise frame member,
the curved parts being configured and arranged to curve upward from the curvature transition points.

8. A vehicle body front section structure comprising:
a pair of longitudinal frame members configured and arranged to extend in a lengthwise direction of a vehicle on both widthwise sides of a front compartment, at least one additional pair of the longitudinal frame members disposed such that the longitudinal frame members are vertically arranged relative to each other, each of the longitudinal frame members having a front end portion with a curved part disposed forwardly of a curvature transition point; and
at least one widthwise frame member having a back surface connected to the front end portions of the longitudinal frame members, respectively, such that the at least one widthwise frame member extends in the widthwise direction of the vehicle,
the curved parts being disposed at locations rearward connection points between the longitudinal frame members and the at least one widthwise frame member such that wedge-shaped open spaces are formed between the back surface of the at least one widthwise frame member and corresponding wall surfaces of the curved parts that faces the back surface of the at least one widthwise frame member,
the curved parts of the longitudinal frame members on corresponding lateral sides of the vehicle being provided with curvatures oriented in the same direction.

9. The vehicle body front section structure recited in claim 8, wherein
the curvatures of the curved parts of the longitudinal frame members are matched to be oriented inwardly in the widthwise direction of the vehicle.

10. The vehicle body front section structure recited in claim 8, wherein
the curvatures of the curved parts of the longitudinal frame members are matched so as to be oriented outwardly in the widthwise direction of the vehicle.

11. The vehicle body front section structure recited in claim 8, wherein
the curvatures of the curved parts of the longitudinal frame members are matched so as to be oriented upwardly.

12. The vehicle body front section structure recited in claim 8, wherein
the curvatures of the curved parts of the longitudinal frame members are matched so as to be oriented downwardly.

13. The vehicle body front section structure recited in claim 8, wherein
the curvatures provided on the curved parts of the one of the pairs of the longitudinal frame members are oriented downwardly of the vehicle and the curvatures provided on the curved parts of the other of the pairs of the longitudinal frame members are oriented in any one of the following directions: inwardly in the widthwise direction of the vehicle, outwardly in the widthwise direction of the vehicle, or upwardly.

14. A vehicle body front section structure comprising:
a pair of longitudinal frame members configured and arranged to extend in a lengthwise direction of a vehicle on both widthwise sides of a front compartment, at least one additional pair of the longitudinal frame members disposed such that the longitudinal frame members are vertically arranged relative to each other, each of the longitudinal frame members having a front end portion with a curved part disposed forwardly of a curvature transition point; and
at least one widthwise frame member having a back surface connected to the front end portions of the longitudinal frame members such that the at least one widthwise frame member extends in the widthwise direction of the vehicle,
the curved parts being disposed at locations rearward connection points between the longitudinal frame members and the at least one widthwise frame member such that wedge-shaped open spaces are formed between the back surface of the at least one widthwise frame member and corresponding wall surfaces of the curved parts that faces the back surface of the at least one widthwise frame member,
the curved parts of at least one of the pairs of the longitudinal frame members being provided with curvatures oriented in a different direction from at least one other of the pairs of the longitudinal frame members.

15. The vehicle body front section structure recited in claim 14, wherein
the curvatures provided on the curved parts of the one of the pairs of the longitudinal frame members are oriented inwardly in the widthwise direction of the vehicle, and the curvatures provided on the curved parts of the other of the pairs of the longitudinal frame members are oriented in any one of the following directions: outwardly in the widthwise direction of the vehicle, upwardly, or downwardly.

16. The vehicle body front section structure recited in claim 14, wherein
the curvatures provided on the curved parts of the one of the pairs of the longitudinal frame members are oriented outwardly in the widthwise direction of the vehicle and the curvatures provided on the curved parts of the other of the pairs of the longitudinal frame members are oriented in any one of the following directions: inwardly in the widthwise direction of the vehicle, upwardly, or downwardly.

17. The vehicle body front section structure recited in claim 14, wherein
the curvatures provided on the curved parts of the one of the pairs of the longitudinal frame members are oriented upwardly in the widthwise direction of the vehicle and the curvatures provided on the curved parts of the other of the pairs of the longitudinal frame members are oriented in any one of the following directions: inwardly in the widthwise direction of the vehicle, outwardly in the widthwise direction of the vehicle, or downwardly.

18. A vehicle body front section structure comprising:

longitudinal frame means for providing support on both widthwise sides of a front compartment in a lengthwise direction of a vehicle, the longitudinal frame means having a front end portion with a hollow, closed cross section curved part disposed forwardly of a curvature transition point; and widthwise frame means for providing support between the front end portions of the longitudinal frame means in a widthwise direction of the vehicle to create a pair of wedge-shaped open spaces between the back surface of the widthwise frame means and corresponding wall surfaces of the curved parts that faces the back surface of the widthwise frame member, the curved part having a load transmitting surface formed along a corresponding one of the wedge-shaped open spaces, with the load transmitting surface being configured and arranged to collapse sequentially against the widthwise frame member during a collision against the widthwise frame member.

19. A vehicle body front section structure comprising:

a pair of longitudinal frame members configured and arranged to extend in a lengthwise direction of a vehicle on both widthwise sides of a front compartment, each of the longitudinal frame members having a front end portion with a hollow, closed cross section collapsing part disposed forwardly of a bending transition point; and at least one widthwise frame member having a back surface connected to the front end portions of the longitudinal frame members such that the at least one widthwise frame member extends in the widthwise direction of the vehicle, the collapsing parts being disposed at locations rearward connection points between the longitudinal frame members and the widthwise frame member such that a pair of wedge-shaped open spaces are formed between the back surface of the at least one widthwise frame member and corresponding wall surfaces of the collapsing parts that faces the back surface of the at least one widthwise frame member, each of the collapsing parts having a load transmitting surface formed along a corresponding one of the wedge-shaped open spaces, with the load transmitting surfaces being configured and arranged to collapse sequentially against the at least one widthwise frame member during a collision against the at least one widthwise frame member.

20. The vehicle body front section structure recited in claim 19, wherein each of the collapsing parts is formed as a separate entity from a main part of the longitudinal frame member with a first rigid connection formed between each of the collapsing parts and the at least one widthwise frame member and a second rigid connection formed between each of the collapsing parts and the a front end of the main part of the longitudinal frame member.

21. The vehicle body front section structure recited in claim 19, wherein the collapsing parts are configured and arranged relative to the longitudinal frame members to initially collapse between each of the at least one widthwise frame member and the longitudinal frame members during a collision prior to axial buckling deformation of the longitudinal frame members.

22. The vehicle body front section structure recited in claim 19, further comprising at least one additional pair of the longitudinal frame members disposed such that the longitudinal frame members are vertically arranged relative to each other with the additional pair of the longitudinal frame members having collapsing parts connected to the at least one widthwise frame member.

23. The vehicle body front section structure recited in claim 22, wherein vertically adjacent ones of the longitudinal frame members bend in different directions.

24. The vehicle body front section structure recited in claim 22, wherein vertically adjacent ones of the longitudinal frame members are rigidly connected together behind the bending transition points.

25. The vehicle body front section structure recited in claim 19, wherein the longitudinal frame members are part of a unitized vehicle body.

* * * * *